US008104060B2

(12) United States Patent
Tanaka

(10) Patent No.: US 8,104,060 B2
(45) Date of Patent: Jan. 24, 2012

(54) INFORMATION TRANSMITTING METHOD AND TELEVISION BROADCAST RECEIVER

(75) Inventor: Yasushi Tanaka, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/284,699

(22) PCT Filed: Aug. 21, 1998

(86) PCT No.: PCT/JP98/03707

§ 371 (c)(1),
(2), (4) Date: Apr. 19, 1999

(87) PCT Pub. No.: WO99/11066

PCT Pub. Date: Mar. 4, 1999

(65) Prior Publication Data

US 2003/0115600 A1 Jun. 19, 2003

(30) Foreign Application Priority Data

Aug. 21, 1997 (JP) .................................. 9-224745

(51) Int. Cl.
*H04N 5/445* (2006.01)
*G06F 3/00* (2006.01)
*G06F 13/00* (2006.01)

(52) U.S. Cl. ............... 725/43; 725/36; 725/40; 725/41; 725/44; 725/50; 725/51; 725/54; 725/67; 725/68; 725/70; 725/71; 725/42; 725/39; 725/110; 725/112; 725/113; 725/116; 725/34

(58) Field of Classification Search ............ 725/36, 725/42, 110, 112, 113, 41, 116, 34, 39, 40, 725/43–44, 50–51, 67–68, 70–71, 54
See application file for complete search history.

(56) References Cited

U.S. PATENT DOCUMENTS

| 5,027,400 | A | * | 6/1991 | Baji et al. ................. 725/116 |
| 5,319,455 | A | * | 6/1994 | Hoarty et al. ................ 725/34 |
| 5,479,266 | A | * | 12/1995 | Young et al. ................ 348/734 |
| 5,557,724 | A | * | 9/1996 | Sampat et al. ................ 725/43 |
| 5,619,274 | A | * | 4/1997 | Roop et al. ................. 348/461 |
| 5,635,978 | A | * | 6/1997 | Alten et al. ................ 725/42 |
| 5,642,153 | A | * | 6/1997 | Chaney et al. ................ 725/40 |
| 5,691,778 | A | * | 11/1997 | Song .......................... 725/59 |
| 5,781,246 | A | * | 7/1998 | Alten et al. ................ 348/564 |
| 5,844,620 | A | * | 12/1998 | Coleman et al. ............. 725/54 |
| 5,892,535 | A | * | 4/1999 | Allen et al. ................ 725/36 |
| 5,903,816 | A | * | 5/1999 | Broadwin et al. ........... 725/110 |

(Continued)

FOREIGN PATENT DOCUMENTS

EP 0 735 750 A2 10/1996

(Continued)

*Primary Examiner* — Jason Salce

(74) *Attorney, Agent, or Firm* — Frommer Lawrence & Haug LLP; William S. Frommer; Thomas F. Presson

(57) ABSTRACT

The address information for reading the detailed information of a computer server which provides the detailed information of distribution information displayed on a predetermined display screen together with a single program or plural programs is transmitted with each program information, so as to realize an information transmitting method and a television broadcasting receiving apparatus which easily obtain, if necessary, the detailed information of the distribution information transmitted with each program information without storage of it at a receiving side.

34 Claims, 14 Drawing Sheets

U.S. PATENT DOCUMENTS

| | | | |
|---|---|---|---|
| 5,940,073 A * | 8/1999 | Klosterman et al. | 725/41 |
| 6,002,394 A * | 12/1999 | Schein et al. | 345/719 |
| 6,029,045 A * | 2/2000 | Picco et al. | 725/34 |
| 6,052,554 A * | 4/2000 | Hendricks et al. | 725/109 |
| 6,075,551 A * | 6/2000 | Berezowski et al. | 725/36 |
| 6,137,549 A * | 10/2000 | Rasson et al. | 725/37 |
| 6,160,545 A * | 12/2000 | Eyer et al. | 345/721 |
| 6,177,931 B1 | 1/2001 | Alexander et al. | |
| 6,266,098 B1 * | 7/2001 | Cove et al. | 348/563 |
| 6,295,092 B1 * | 9/2001 | Hullinger et al. | 348/468 |
| 6,396,544 B1 | 5/2002 | Schindler et al. | |
| 6,477,705 B1 * | 11/2002 | Yuen et al. | 725/41 |
| 6,487,722 B1 * | 11/2002 | Okura et al. | 725/40 |
| 6,492,997 B1 * | 12/2002 | Gerba et al. | 345/721 |
| 6,522,342 B1 * | 2/2003 | Gagnon et al. | 345/716 |
| 6,588,013 B1 * | 7/2003 | Lumley et al. | 725/32 |
| 6,625,810 B1 * | 9/2003 | Murphy et al. | 725/39 |
| 6,802,076 B1 | 10/2004 | Terakado et al. | |
| 7,039,935 B2 | 5/2006 | Knudson et al. | |

FOREIGN PATENT DOCUMENTS

| | | |
|---|---|---|
| EP | 0 836 321 | 4/1998 |
| GB | 2 307 628 | 5/1997 |
| JP | 7 288759 | 10/1995 |
| JP | 8 18521 | 1/1996 |
| JP | 8 111823 | 4/1996 |
| JP | 8 234709 | 9/1996 |
| JP | 8 289266 | 11/1996 |
| JP | 8-289268 | 11/1996 |
| JP | 8-289269 | 11/1996 |
| WO | 94 13107 | 6/1994 |
| WO | 96 41478 | 12/1996 |
| WO | WO 97 02701 | 1/1997 |
| WO | WO 97 13368 | 4/1997 |
| WO | 97 29591 | 8/1997 |
| WO | 97 42763 | 11/1997 |

* cited by examiner

INFORMATION TRANSMITTING METHOD AND TELEVISION BROADCAST RECEIVER

DESCRIPTION

1. Technical Field

The present invention relates to an information transmitting method and a television broadcasting receiving apparatus, and more particularly, applicable to a program broadcasting system for guiding and displaying information relating to each program, when a viewer selects a necessary program among from a large number of television programs transmitted through a satellite broadcasting.

2. Background Arts

Recently, in a satellite broadcasting system for sending television programs to viewers via a broadcasting satellite, a method for compressive-encoding and multiplexing the program data of plural channels by using the MPEG2 (Moving Picture Image Coding Experts Group Phase 2) and transmitting it has been proposed. Such digital transmitting method can transmit a vast of programs at the same time, thereby increasing the number of programs a viewer can select.

The program data encoded and multiplexed by the MPEG2 is multiplexed with program guide information, and transmitted. The program guide information is displayed at a receiver in the form like a television program guide column on a newspaper, for example.

The program guide information is repeatedly transmitted so as to be received at a receiver side at any time, and as the number of programs increases, the data size becomes larger. Also, the program guide information includes the information of programs which will be broadcasted in the future, and the data size changes depending on the condition that the program guide information of how many days ahead is transmitted. To display such a large number of data at a receiving side instantly, it can be considered that a recording medium such as a hard disk is provided in the receiver to successively store the transmitted program data.

However, if a recording medium such as a hard disk is provided in a receiving side, the whole construction of a receiver becomes complicated and large, and there is a problem that it costs the viewer. When the size of data to be transmitted becomes larger, the number of times the data can be repeatedly transmitted is reduced at a transmitting side. As a result, the receiving side can not display a program guide instantly, so that the size of data to be transmitted as program guide information is necessarily limited within the minimum. Thereby, even if a user wants to know the detailed program information more, the information is not transmitted, or it takes a long time to receive it. Moreover, the information which is not directly related to a program, such as a commercial (CM), is not transmitted in detail.

DISCLOSURE OF THE INVENTION

This invention is to solve the problems described above, and to provide an information transmitting method and a television broadcasting receiving apparatus which can easily obtain, if necessary, distribution information transmitted together with program data without being stored at a receiving side.

To solve the above problems, according to this invention, address information for reading the detailed information from a computer server which provides the detailed information of the distribution information displayed together with the information of a program or plural programs on a predetermined display screen is transmitted together with the information of each program.

Further, according to this invention, there provides specifying means for specifying the distribution information displayed together with the information of a program or plural programs on a predetermined display screen, and access means for accessing a computer server which provides the detailed information of the distribution information specified by the specifying means through a computer network and taking in the detailed information from the computer server, based on the address information transmitted together with the information of each program. The detailed information taken in by the access means is displayed on the display screen.

As a result, this can prevent the receiving apparatus from being large and complicated construction due to the storage of all the detailed information of the distribution information transmitted together with the information of each program, and avoid the uneconomical method that the detailed information of the distribution information which is interested by a user is transmitted by using a television broadcasting.

BEST MODE FOR CARRYING OUT THE INVENTION

Figure 1:
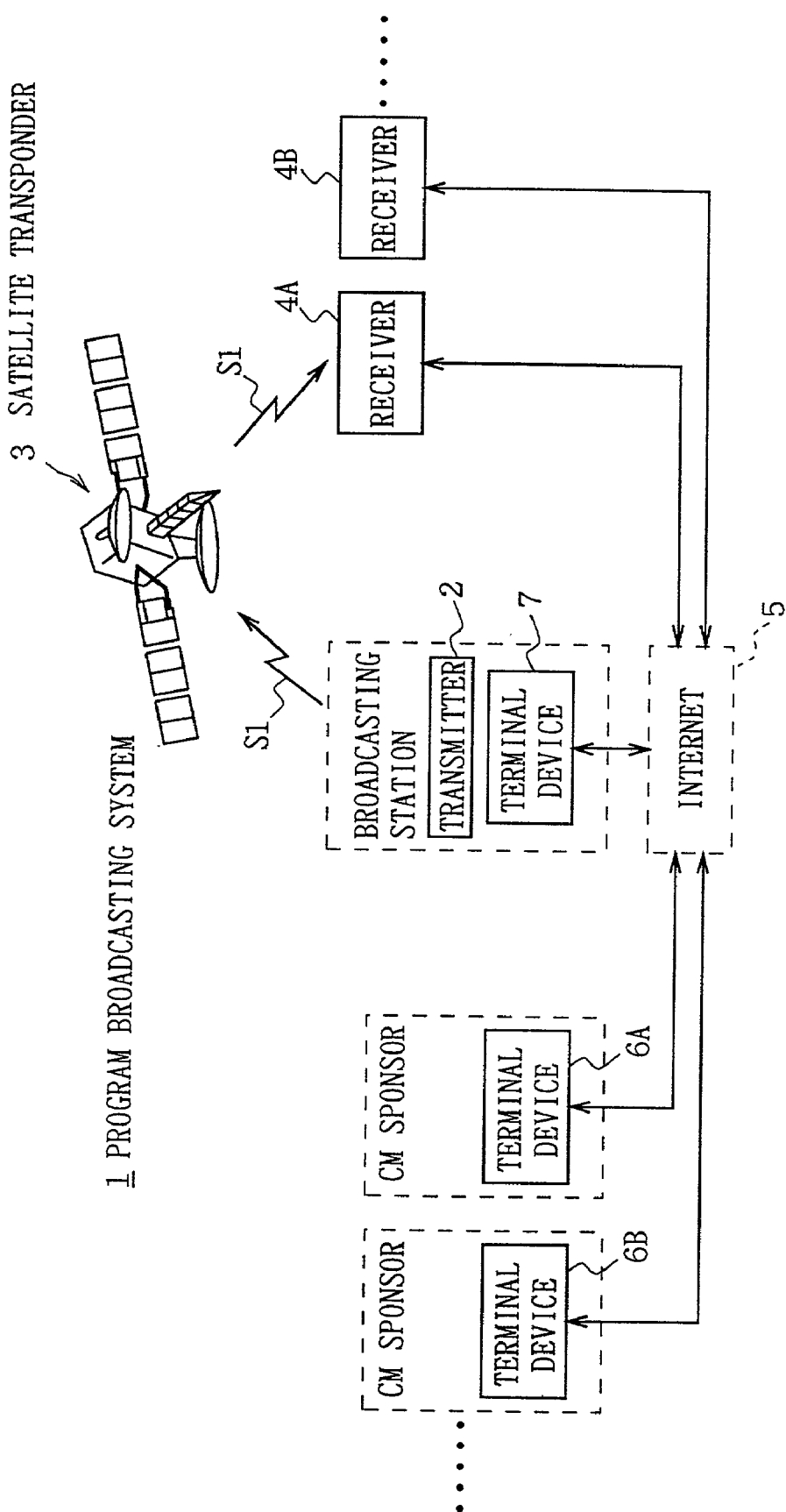
FIG. 1 is a block diagram showing the whole construction of a program broadcasting system according to the present invention.

Hereinafter, the embodiment of this invention will be described in details referring to the drawings.

(1) The whole construction of a program broadcasting system

In FIG. 1, 1 shows a program broadcasting system as a whole. In a broadcasting station, various television programs are produced and various commercials (CM) are produced based on the commercial information provided from each CM sponsor in accordance with an advertisement contract with a plurality of CM sponsors. Further, in the broadcasting station, the commercial information provided from a plurality of sponsors is superimposed on a program guide in addition to usual television programs.

A transmitter 2 provided in the broadcasting station transmits television programs and CM video audio data (hereinafter, referred to as program data and CM data, respectively) which comprise plural channels, by transport streams prescribed by the MPEG2 systems, and at the same time transmits program guide information (hereinafter, referred to as EPG (Electronic Program Guide) data).

In the MPEG2 systems, a large number of individual transport streams are time-division-multiplied by a transport packet of comparatively short transmission unit, so as to transmit the program information of multichannel.

The information for identifying the contents of packet data is assigned to the header portion of the transport packet. A receiver which receives the broadcasting wave separates a packet necessary to decode by the information for identifying the contents.

In each of receivers 4, the transport packets of program data, CM data, and EPG data of a desired channel are respectively picked up from the multiplexed transport stream which is based on the received broadcasting wave S1. Based on the video audio data stored in these transport packets, a processing for decoding/displaying a program and CM and a processing for displaying a program guide are performed.

Here, each CM sponsor and broadcasting station (FIG. 1) have terminal devices 6A, 6B, . . . , and 7 which are respectively connected to an Internet 5. Each of the terminal devices 6A, 6B, . . . , and 7 can set up a personal home page as a www server, and can search the set up home page by other terminal devices to display the information of the searched home page if necessary.

Also, each of the receivers 4A, 4B, . . . contains a modem inside thereof, so as to connect to the Internet 5 through an Internet service provider (now shown). Thereby, each of the receivers 4A, 4B, . . . can search various home pages which are set up in the www server to take in the information of a desired home page.

(2) The construction of transmitter

Figure 2:
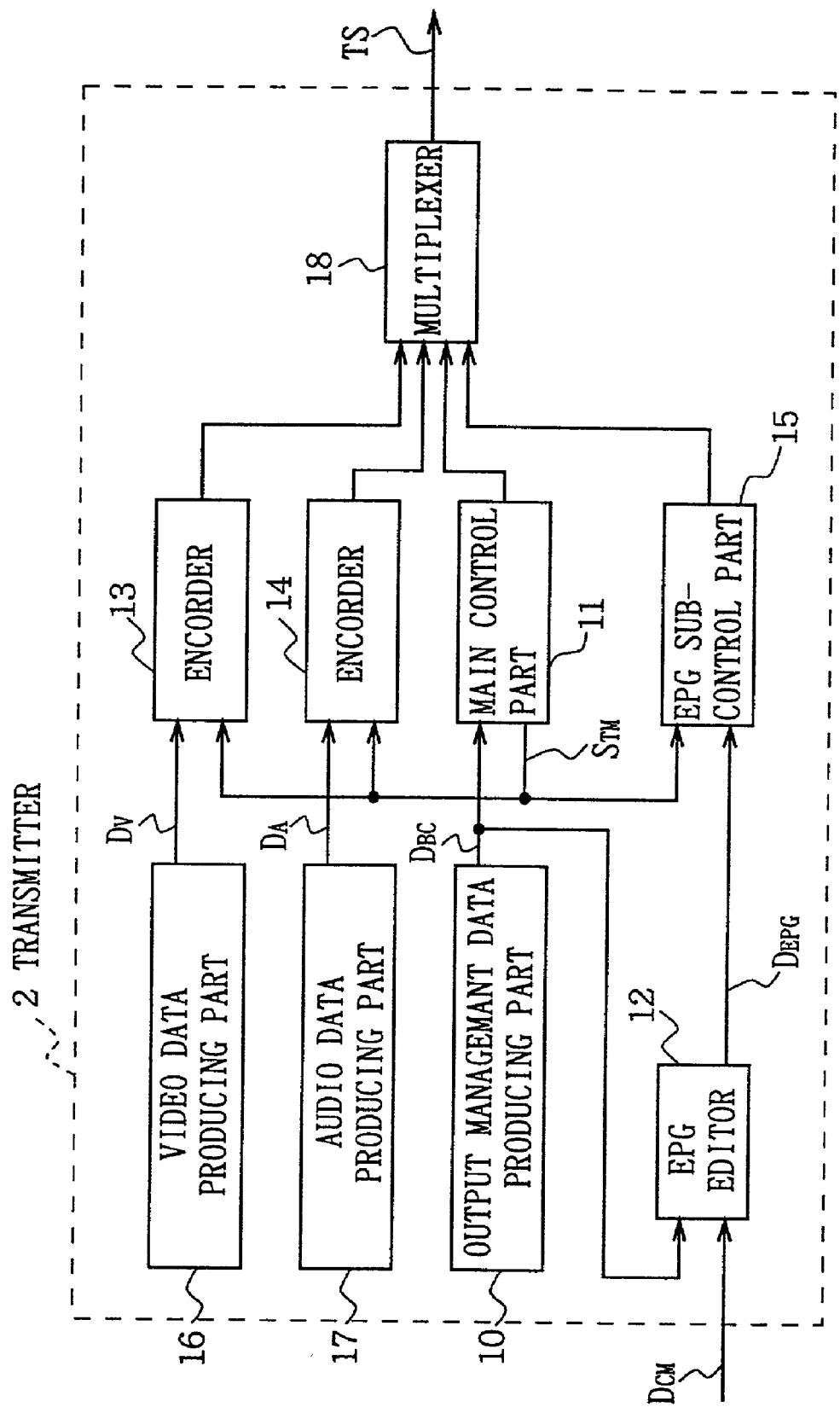
FIG. 2 is a block diagram showing the construction of a transmitter according to the present invention.

As shown in FIG. 2, the transmitter 2 in the broadcasting station produces output management data comprising broadcasting time information, program ID, and so on in an output management data producing part 10, and supplies this data to a main control part 11 and an EPG editor 12 as output management data $D_{BC}$. The main control part 11 generates timing control signal $S_{TM}$ which represents a timing of outputting each program, based on the output management data $D_{BC}$, and outputs this signal to encoders 13, 14 and an EPG sub-control part 15 to control the operation of outputting data in each circuit.

A video data producing part 16 and an audio data producing part 17 produce video data $D_V$ and audio data $D_A$ which consist of various program data and CM data, which are compressive-encoded by the MPEG2 through the encoders 13 and 14 respectively. Then, they are synchronized with the timing control signal $S_{TM}$ to be supplied to a multiplexer 18.

Further, the EPG editor 12 takes in the output management data $D_{BC}$ and the commercial information $D_{CM}$ provided from plural CM sponsors (FIG. 1), and based on this data, produces EPG data $D_{EPG}$ to supply this to the EPG sub-control part 15.

In the EPG sub-control part 15, the supplied EPG data $D_{EPG}$ is synchronized with the timing control signal $S_{TM}$ to supply this to the multiplexer 18.

The multiplexer 18 time-division-multiplies the encoded video data $D_V$, audio data $D_A$, and EPG data $D_{EPG}$, so that these data are transmitted as a transport stream TS.

(3) The construction of EPG data

Figure 3:
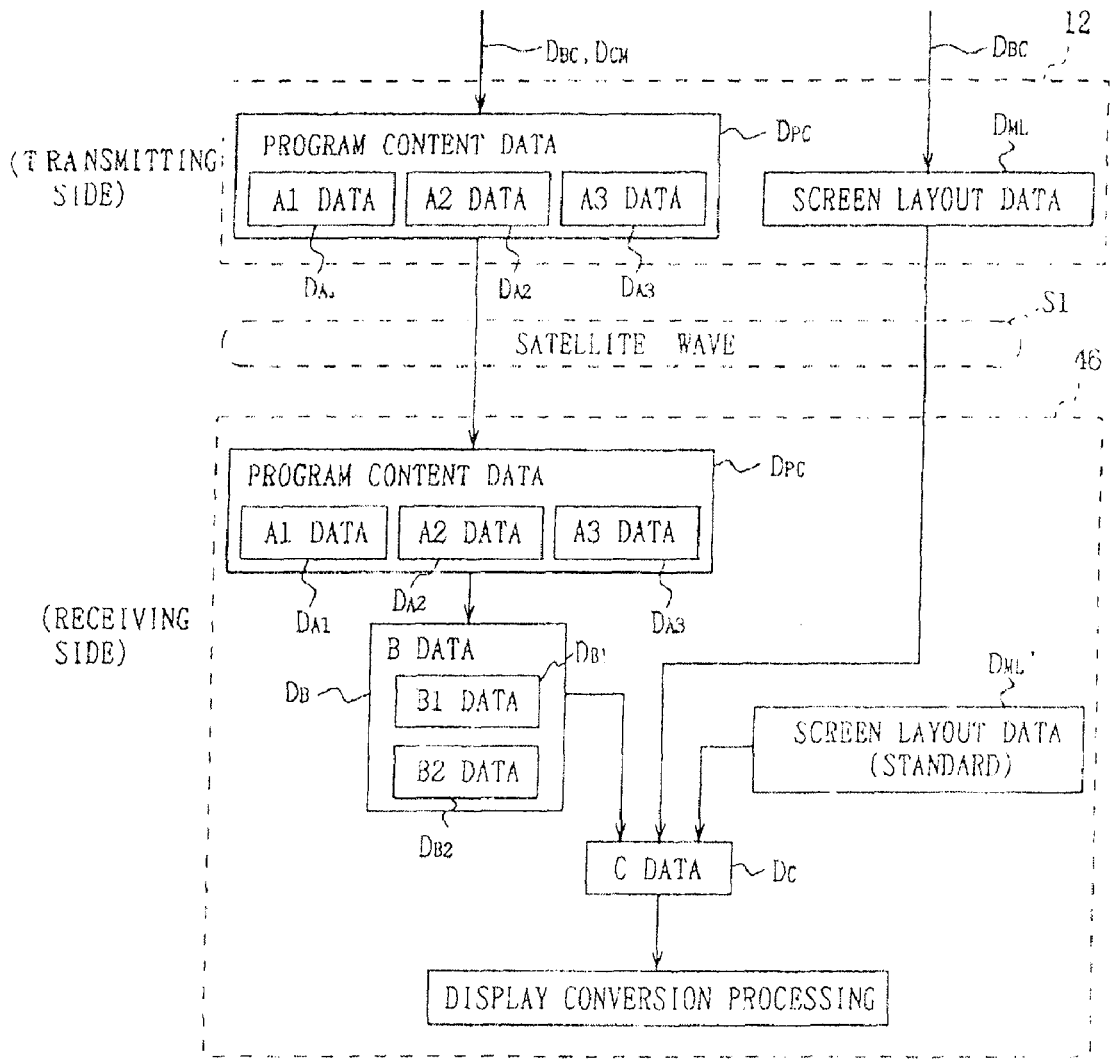
FIG. 3 is a schematic diagram explaining the structure of EPG data.

Here, as shown in FIG. 3, the EPG data $D_{EPG}$ produced by the EPG editor 12 of the transmitter 2 consists of the information $D_{PC}$ relating to the programs of each broadcasting channel during several ten hours from current time (e.g., channel of program, broadcasting time, title, genre, program comments, and so on) (hereinafter, referred to as program content data), and the information $D_{ML}$ relating to the layout of screen for displaying a program list and the detailed information of a program (hereinafter, referred to as screen layout data).

The program content data $D_{PC}$ hierarchically consists of: the data in which an information group representing program contents for each program is assigned to plural programs each having a broadcasting form such as for regular program, for rebroadcasting, for broadcasting at a key station, or for broadcasting at a local station (hereinafter, referred to as A1 data); the data in which only a particular information group which is common in a plurality of programs of the A1 data is arranged as a single program (hereinafter, referred to as A2 data); and the data which represents the detailed contents of the information groups consisting of respective programs of the A1 data and the A2 data (hereinafter, referred to as A3 data). Here, the A1 data is possible to be changed depending on the broadcasting form, such as broadcasting year/month/date and the broadcasting starting time. The A2 data is a fixed information which is not changed depending on the broadcasting form, such as the program name, program detailed information, still pictures, sounds, moving pictures, and the names of guests. The A3 data is comparatively large sized data and detailed information, such as still pictures, sounds, moving pictures, a guide, the names of guests, broadcasting form, a category, and the name of broadcasting station. In the case of the multichannel broadcasting such as a digital satellite broadcasting, the same program is repeatedly broadcasted with an interval, so that the program information which changes when broadcasted repeatedly is set to as the A1 data, and the program information which does not change when broadcasted repeatedly is set to as the A2 data.

Figure 4:
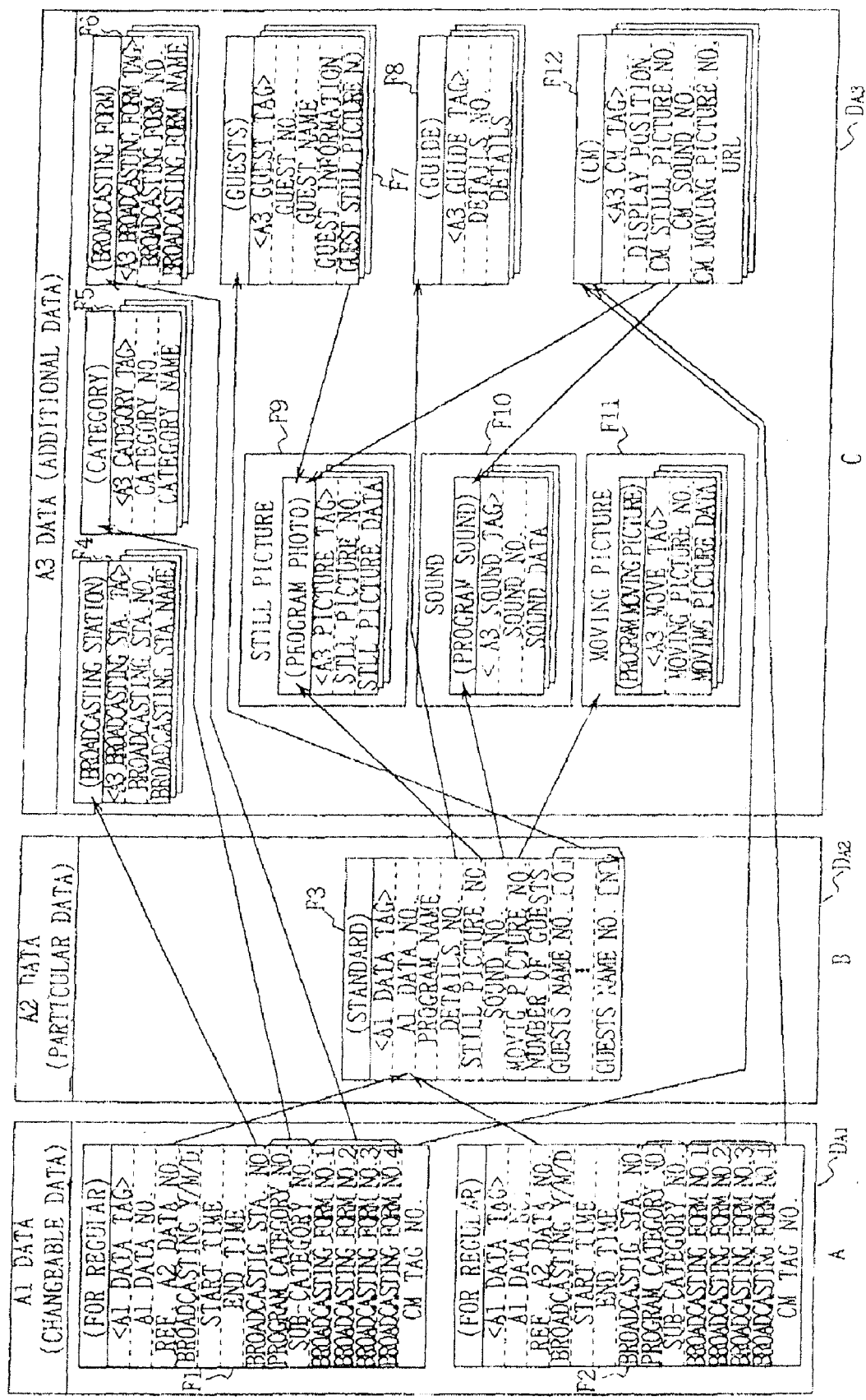
FIG. 4 is a schematic diagram explaining the structure of program content data of the EPG data in FIG. 3.

In details, as shown in FIG. 4A, the A1 data $D_{A1}$ consists of several data relating to each program (for regular broadcasting F1 and for rebroadcasting F2), such as "A1 DATA TAG" representing the A1 data, "A1 DATA NO." representing the serial number of the A1 data, "REF. A2 DATA NO." representing the serial number for referring to the A2 data, "BROADCASTING Y/M/D", "START TIME", "END TIME", "BROADCASTING STA. NO.", "PROGRAM CATEGORY NO." representing the number of the type of programs such as news, entertainment, and movie, "SUB-CATEGORY NO.", "BROADCASTING FORM NO." representing the number of the form such as stereo, bilingual, and clear vision, and "CM TAG NO." representing the CM information.

Further, as shown in FIG. 4B, the A2 data $DA_2$ comprises a program (standard program) F3 that the common data among the programs of the A1 data are collected and put in order, and consists of respective serial numbers for referring to the data of program name, program detailed information, still picture, sound, moving picture, and the name of guests, such as "A2 DATA TAG" representing the A2 data, "A2 DATA NO." representing the serial number of the A2 data, "PROGRAM NAME", "DETAILS NO.", "STILL PICTURE NO.", "SOUND NO.", "MOVING PICTURE NO.", "NUMBER OF GUESTS", "GUEST NAME NO.[0]", . . . , and "GUEST NAME NO.[N]".

Further, as shown in FIG. 4C, the A3 data $D_{A3}$ consists of the data representing the detailed contents relating to still picture, sound, moving picture, guide, the name of guests, broadcasting form, category, the name of broadcasting station, and CM, among the programs of the A1 data and A2 data.

For example, data F4 relating to the broadcasting station consists of "A3 BROADCASTING STA. TAG" representing the A3 data, "BROADCASTING STA. NO.", and "BROADCASTING STA. NAME". Further, data F5 relating to category consists of "A3 CATEGORY TAG", "CATEGORY NO.", and "CATEGORY NAME". Furthermore, data F6 relating to the broadcasting form consists of "A3 BROADCASTING FORM TAG", "BROADCASTING FORM NO.", and "BROADCASTING FORM NAME". Data F7 relating to guests consists of "A3 GUEST TAG", "GUEST NO.", "GUEST NAME", "GUEST INFORMATION", and "GUEST STILL PICTURE NO.". Data F8 relating to the program detailed information consists of "A3 GUIDE TAG", "DETAILS NO.", and "DETAILS".

Also, data F9 of still picture consists of "A3 PICTURE TAG", "STILL PICTURE NO.", and "STILL PICTURE DATA". Sound data F10 consists of "A3 SOUND TAG", "SOUND NO.", and "SOUND DATA". Moving picture data F11 consists of "A3 MOVIE TAG", "MOVING PICTURE NO.", and "MOVING PICTURE DATA".

Furthermore, data F12 relating to CM consists of "A3 CM TAG", "DISPLAY POSITION", "CM STILL PICTURE NO.", "CM SOUND NO.", "CM MOVING PICTURE NO.", and "URL (Uniform Resource Locater)". The URL is the standards which is provided to prescribe means for accessing the information resource of Internet (e.g., www server) and the name of information resource.

Here is the case where the program "○○○○" is practically broadcasted at 12:00 pm, and is rebroadcasted at 17:00 pm. The EPG editor 12 firstly produces the A1 data $D_{A1}$ of program for regular broadcasting F1 and the A1 data $D_{A1}$ of program for rebroadcasting F2, based on the output management data $D_{BC}$ having the program information of "○○○○", and then produces the A2 data $D_{A2}$ which is referred in common between these A1 data $D_1$. The EPG editor 12 then produces the A3 data $D_{A3}$ which is more detailed data referred by the A1 data $D_{A1}$ and A2 data $D_{A2}$. The data F12 relating to CM of the A3 data $D_{A3}$ is produced by the EPG editor 12 based on the commercial information $D_{CM}$ described above.

(4) The construction of receiver

Figure 5:
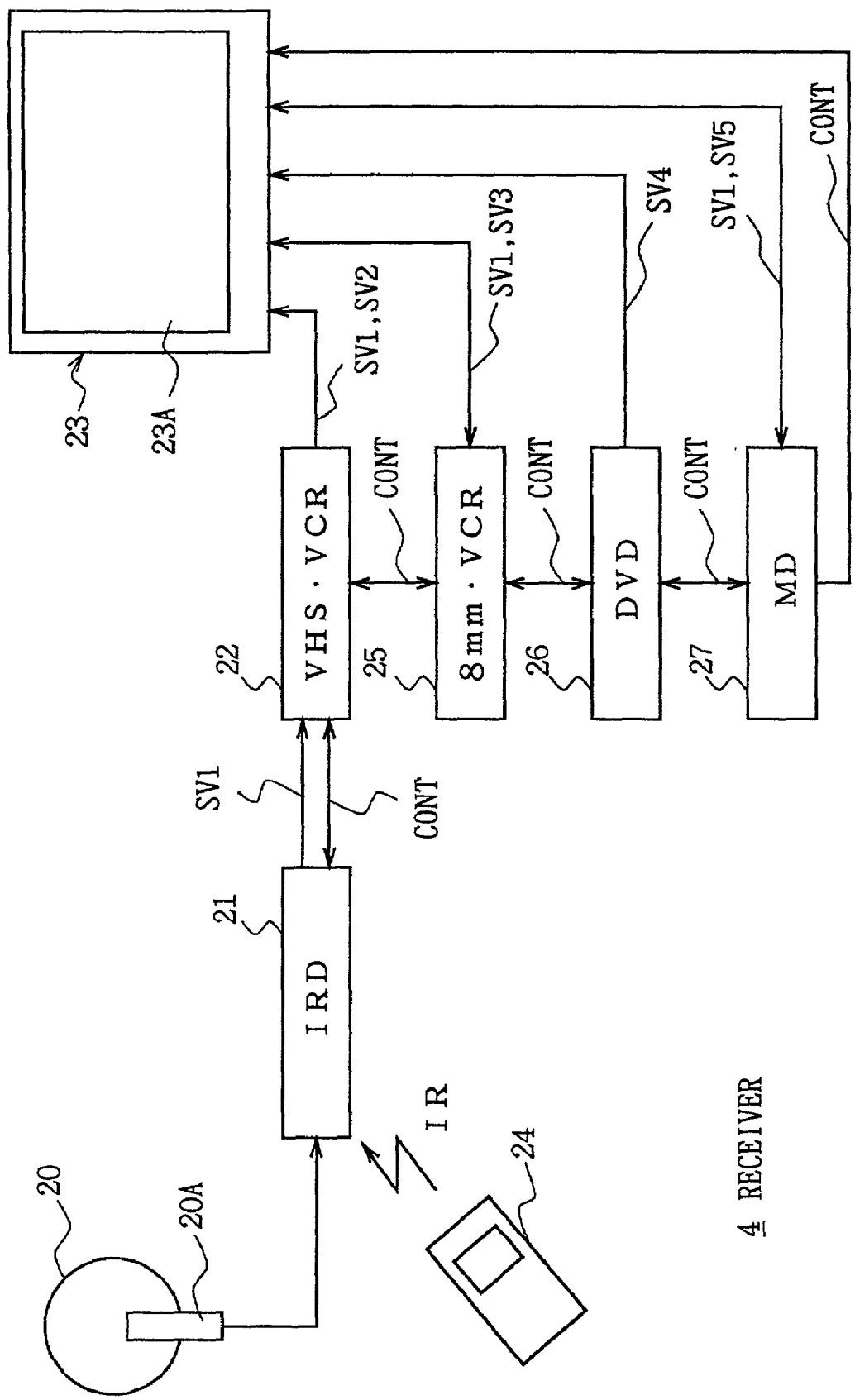
FIG. 5 is a block diagram showing the construction of a receiver.

In the receiver 4 in FIG. 5, the broadcasting wave S1 received by a parabolic antenna 20 is demodulated and compressive-decoded at an integrated receiver/decoder (IRD) 21. The resultant video/audio signal SV1 is output to a VCR (Video Cassette Recorder) 22 of the VHS system.

The VCR 22 records the video/audio signal SV1 in a video tape loaded inside, or outputs the video/audio signal SV1 from an output line as it is to a monitor device 23 to display it on the monitor.

When a viewer operates a remote commander 24, the command corresponding to the operation is converted into infrared ray signal IR to be output to the integrated receiver/decoder 21. The integrated receiver/decoder 21 executes various operations based on the command, the operations such as channel change, registering/reading user data, outputting control signal CONT to respective devices (the VCR 22, the VCR 25, the DVD 26, and the MD 27) which are connected to the integrated receiver/decoder 21. The control signal CONT is output to the VCR 22 through a control line.

When the VCR 22 is specified as a target to be controlled by the control signal CONT, the VCR 22 is controlled by the control signal CONT. On the other hand, when any of devices which are successively connected to the VCR 22 through the control line (the VCR 25 of 8 mm system, the digital video disc (DVD) player 26, the mini disc (MD) player 27, and the monitor device 23) is specified, the VCR 22 outputs the control signal CONT as it is to the following VCR 25 of 8 mm system.

When receiving the control signal CONT, the VCR 25 determines the device specified by the control signal CONT. When the determined result is the VCR 25, the VCR 25 executes the operation specified by the control signal CONT. If the command is for reproducing a 8 mm video tape loaded in the VCR 25 for example, the VCR 25 reproduces the video tape, so as to output the reproduced video signal SV3 to the monitor device 23 to display it.

Further, if the command of the control signal CONT is for recording, at the VCR 25, the broadcasting signal (video/audio signal SV1) received and decoded by the integrated receiver/decoder 21, the VCR 25 records the video/audio signal SV1 input from the integrated receiver/decoder 21 through the VCR 22 of the VHS system and the monitor device 23. On the other hand, if the VCR 25 is not a target to be controlled by the control signal CONT, the VCR 25 outputs the control signal CONT as it is to the following DVD 26.

When receiving the control signal CONT, the DVD 26 determines the device specified by the control signal CONT. When the determined result is the DVD 26, the DVD 26 executes the operation specified by the control signal CONT. If the command is for reproducing an image and/or sound from a disc loaded in the DVD 26 for example, the DVD 26 reproduces the disc, so as to output video/audio signal SV4 to the monitor device 23 to display it. On the other hand, if the DVD 26 is not a target to be controlled by the control signal CONT, the DVD 26 outputs the control signal CONT to as it is the following MD 27.

When receiving the control signal CONT, the MD 27 determines the device specified by the control signal CONT. When the determined result is the MD 27, the MD 27 executes the operation specified by the control signal CONT. If the command is for reproducing a disc loaded in the MD 27 for example, the MD 27 reproduces the disc, so as to output audio signal SV5 to the monitor device 23 to display that it can be listened.

Also, if the command of the control signal CONT is for recording, at the MD 27, the broadcasting signal (video/audio signal SV1) received and decoded by the integrated receiver/decoder 21, the MD 27 records the audio signal of the video/audio signal SV1 input from the integrated receiver/decoder 21 through the VCR 22 of the VHS system and the monitor device 23. On the other hand, if the MD 27 is not a target to be controlled by the control signal CONT, the MD 27 outputs the control signal CONT as it is to the following monitor device 23. At this time, the monitor device 23 executes the operation specified by the control signal CONT.

(5) The construction of receiving and decoding device

Figure 6:
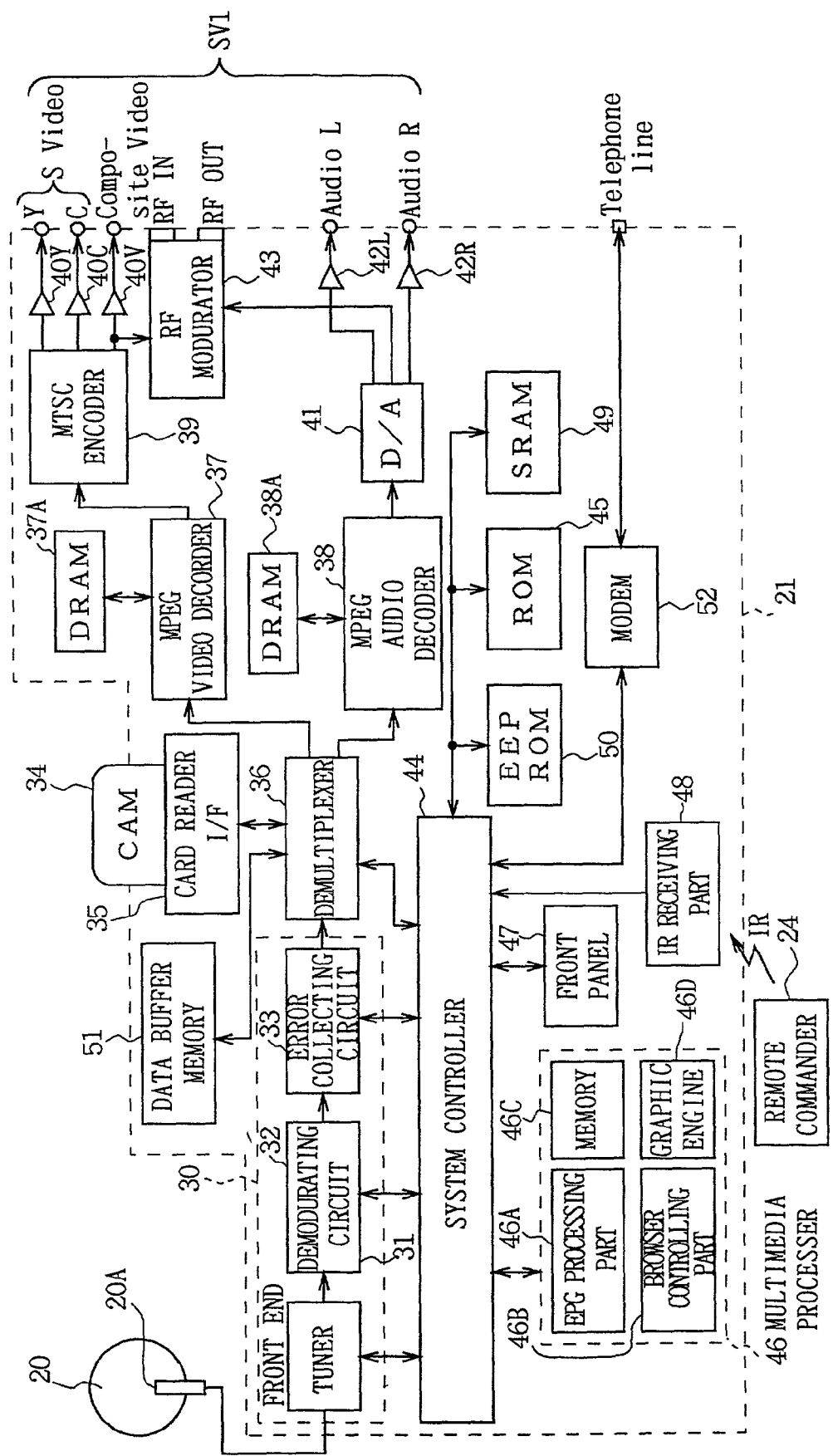
FIG. 6 is a block diagram showing the construction of a receiver/decoder provided in the receiver in FIG. 5.

As shown in FIG. 6, in the integrated receiver/decoder 21, the broadcasting wave received by a LNB (Low Noise Block Downconverter) 20A of the parabolic antenna 20 is supplied to a front end 30. Note that the program guide information (EPG data) and so on are superimposed on the broadcasting wave in accordance with the prescribed format.

The front end 30 is provided with a tuner 31, a demodulating circuit 32, and an error correcting circuit 33, and respective circuit parts are controlled by a system controller 44. The broadcasting wave received by the antenna 20 is supplied to the tuner 31. The tuner 31 performs a tuning processing in accordance with the control of the system controller 44. The output of the tuner 31 is supplied to the demodulating circuit 32 to be demodulated. The output of the demodulating circuit 32 is supplied to the error correcting circuit 33, in which an error is detected and corrected, and if necessary compensated.

In a CAM (Conditional Access Module) 34 comprising a CPU and an IC card comprising a ROM and a RAM, a key necessary to decode codes is stored together with the decoding program. Because the signal transmitted via a broadcasting satellite is coded, the key and the decoding processing are needed to decode the codes. Then, the key is read out from the CAM 34 through a card reader interface 35, and is supplied to a demultiplexer 36. The demultiplexter 36 uses the key to decode the coded signal.

The demultiplexer 36 receives the signal output from the error correcting circuit 33 of the front end 30, and temporarily stores it in a data buffer memory 51 comprising a DRAM (Dynamic Random Access Memory) or a SRAM (Static Random Access Memory). The demultiplexer 36 suitably reads this, and supplies the video signal of the read signal to a MPEG video decoder 37 and supplies audio signal to a MPEG audio decoder 38.

The MPEG video decoder 37 stores the digital video signal supplied from the demultiplexer 36 in a DRAM 37A to decode the video signal compressed by the MPEG system. The decoded video signal is supplied to a NTSC encoder 39, which is converted into luminance signal (Y), chroma signal (C), and composite signal (V) of the NTSC system. the luminance signal (Y) and the chroma signal (C) are output as S video signal through buffer amplifiers 40Y and 40C. The composite signal is output through a buffer amplifier 40V.

The MPEG audio decoder 38 stores the digital video signal supplied from the demultiplexer 36 in a DRAM 38A to decode the audio signal compressed by the MPEG system. The decoded audio signal is digital-to-analog converted in a D/A converter 41. The audio signal of left channel is output through a buffer amplifier 42L. The audio signal of right channel is output through a buffer amplifier 42R.

A RF modulator 43 converts the composite signal output from the NTSC encoder 39 and the audio signal output from the D/A converter 41 into RF signal, and outputs it. Further, when the television (TV) mode is set, the RF modulator 43 passes through the television signal of the NTSC system input from other AV device such as a cable box, and outputs it to other device. In this embodiment, the video signal and audio signal are supplied to the VCR 22 through the AV line.

The system controller 44 executes various processings in accordance with the programs stored in the ROM (Read Only Memory) 45. For instance, the system controller 44 controls the tuner 31, the demodulating circuit 32, and the error correcting circuit 33 which are provided in the front end 30.

To the system controller 44, a predetermined command can be directly input by operating an operation button switch (not shown) of a front panel 47. Further, when the operation keys of the remote commander 24 are operated, the infrared ray signal is output from an IR sending part of the remote commander 24 and received by an IR receiving part 48, and then the received result is supplied to the system controller 44. Thereby, the remote commander 24 is operated so as to input a predetermined command to the system controller 44.

The multiplexer 36 takes in the EPG data $D_{EPG}$ (which is temporarily stored in the buffer memory 51) excepting the MPEG video data and audio data supplied from the front end 30, and supplies it to a multimedia processor 46 through the system controller 44. The multimedia processor 46 comprises an EPG processing part 46A, a browser controlling part 46B, a memory 46C, and a graphic engine 46D. The multimedia processor 46 produces data for displaying a screen such as a program list, contains a browser software of Internet, and performs HTML (Hyper Text Markup Language) processing.

The program guide information (EPG data) includes the information relating to programs of each broadcasting channel during a predetermined term from current time (e.g., still picture of program, channel, broadcasting time, title, and category). The program guide information is transmitted frequently, so that the latest EPG data is always maintained in a memory 46C of the multimedia processor 46.

An EPG processing part 46A picks up necessary items of the A1 to A3 data $D_{A1}$ to $D_{A3}$ constituting the program content data $D_{PC}$ from the EPG data $D_{EPG}$ stored in the memory 46C so that they correspond to the layout of the display screen based on the screen layout data $D_{ML}$ and produces the data $D_B$ of a predetermined format (hereinafter, referred to as B data) (FIG. 3). The B data $D_B$ has two types of format and consists of the data $D_{B1}$ and $D_{B2}$ (hereinafter, referred to as B1 data and B2 data). The B2 data $D_{B2}$ refers to the B1 data $D_{B1}$.

Further, the EPG processing part 46A refers to the program content data $D_{PC}$, and based on the B1 data $D_{B1}$, the B2 data $D_{B2}$ and the screen layout data $D_{ML}$, produces the display data $D_C$ (hereinafter, referred to as C data) (FIG. 3 described later) that various program detailed information are assigned to the layout of the screen for displaying the EPG data $D_{EPC}$ (hereinafter, referred to as EPG screen). The display data of the EPG screen produced in this way is written in the DRAM 37A with a bit map form. The display data written in the DRAM 37A is processed by the MPEG video decoder 37 to be displayed.

Also, the browser controlling part 46B creates bit map data of home page based on the HTML data transmitted from the www server on the Internet 5 through a modem 52 connected to a telephone line and the system controller 44, and writes it in the DRAM 37A. The display data written in the DRAM 37A is processed by the MPEG video decoder 37 to be displayed.

In this way, the EPG processing part 46A and the browser controlling part 46B process the EPG screen and the bit map data of the home page, so that the EPG screen and the home page can be displayed and viewed.

An EEPROM (Electrically Erasable Programmable Read Only Memory) 50 appropriately stores data which is desired to be kept after a power supply is turned off, such as various setting data which is set by a user in various items on a menu screen (e.g., favorite channel data set by a user), and channel number received immediately before a predetermined operation is performed (the last channel).

In the case where a sleep mode is set, the system controller 44 makes a minimum number of circuits, such as the front end 30, the demultiplexer 36, and the data buffer memory 51, to be in the operable state, even if the power supply is turned off, and checks the current time from the time information included in the reception signal thereby controlling each circuit to execute a predetermined operation at a predetermined time. For instance, a timer automatic recording can be performed by operating with the external VCR.

In the case where a predetermined on-screen display (OSD) data is desired to be generated, the system controller 44 controls the MPEG video decoder 37. More specifically, the system controller 44 creates a predetermined on-screen display data, and writes it in the on-screen display data area of the DRAM 37A of the MPEG video decoder 37 as bit map data. Thereby, predetermined characters, figures, images, and so on are appropriately output to the display screen 23A of the monitor device 23 to be displayed.

Further, a SRAM 49 is used as a work memory of the system controller 44. The modem 52 transfers data through the telephone line under the control of the system controller 44.

(6) Display and conversion processing of EPG data

A data processing procedure, which creates the C data $D_C$ from the EPG data $D_{EPG}$ obtained by receiving the broadcasting wave S1 and performs a display and conversion processing such as the generation of bit map data of the EPG screen in the multimedia processor 46 shown in FIG. 6, is explained here.

Among from the A1 data $D_{A1}$, A2 data $D_{A2}$, and A3 data $D_{A3}$, which are stored in the memory 46C in the multimedia processor 46 through the parabolic antenna 20, the front end 30, the demultiplexer 36, and the system controller 44, necessary items are extracted by the EPG processing part 46A in accordance with the layout of display screen, to create B1 data $D_{B1}$ and B2 data $D_{B2}$.

Figure 7:
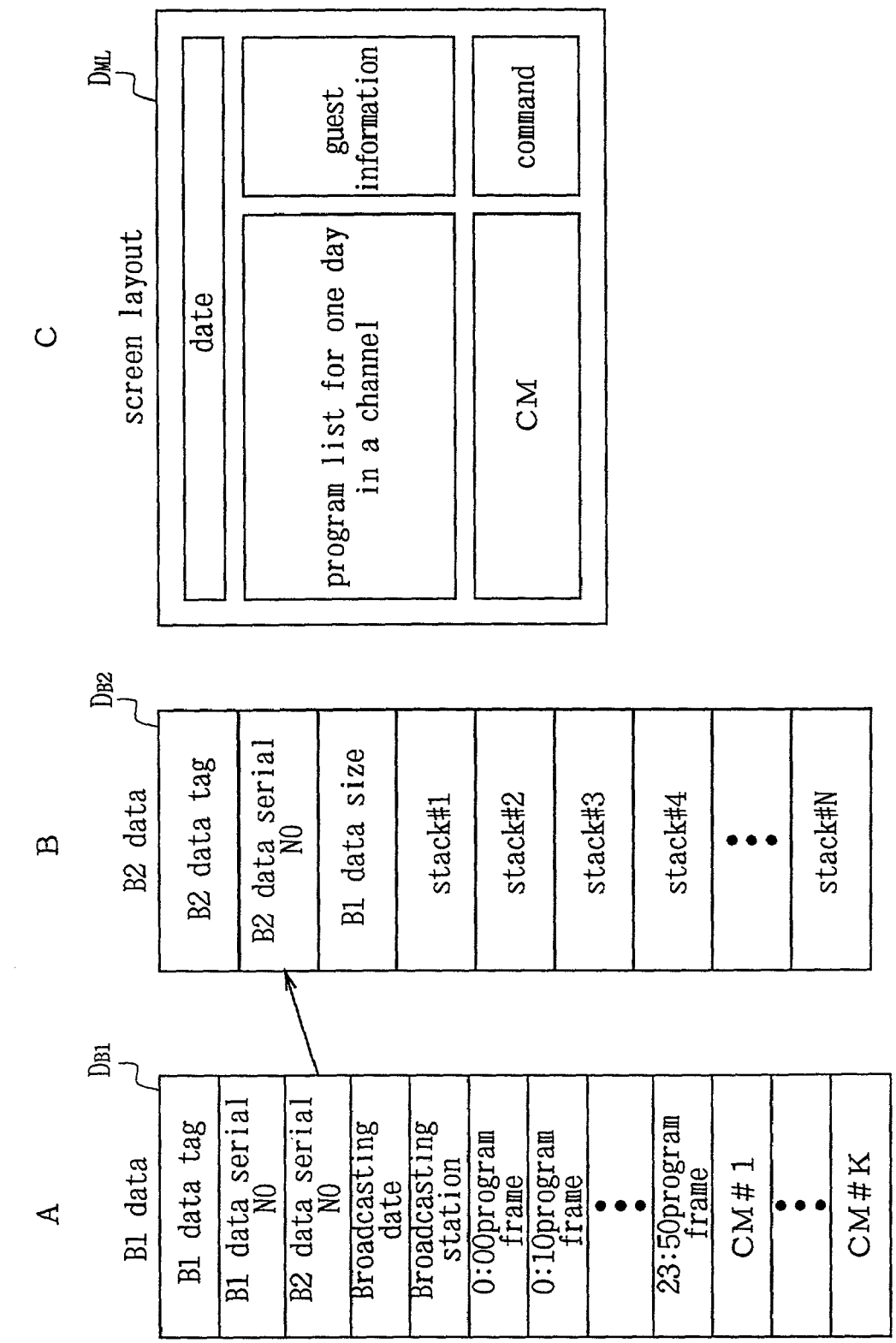
FIG. 7 are schematic diagrams showing B data and the screen layout.

Each data structure and data contents of the B1 data $D_{B1}$ and B2 data $D_{B2}$ are different depending on the layout of the EPG screen based on the screen layout data $D_{ML}$. For example, in the case where the layout of the EPG screen is to make a program list screen for displaying programs for one day in a predetermined channel, as shown in FIG. 7, based on the screen layout data $D_{ML}$, program frames for 24-hours are set in the B1 data $D_{B1}$ as shown in FIG. 7A.

More specifically, the B1 data $D_{B1}$ consists of "B1 DATA TAG" representing B1 data, "B1 DATA SERIAL NO." representing the serial number of the B1 data, "B2 DATA SERIAL NO." representing the serial number of the B2 data corresponding to the B1 data, "BROADCASTING DATE", "BROADCASTING STATION", "0:00 PROGRAM FRAME", "0:10 PROGRAM FRAME", . . . , "23:50 PROGRAM FRAME" representing program frames set for every predetermined time, and "CM#1" to "CM#K". The CM tag numbers corresponding to respective program columns of a program list are assigned to the CM#1 and CM#K in this case.

The B2 data $D_{B2}$ is data obtained by referring the B1 data $D_{B1}$, and as shown in FIG. 7B, B2 data $D_{B2}$ consists of "B2 DATA TAG" representing B2 data, "B2 DATA SERIAL NO." representing the serial number of the B2 data, "B2 DATA SIZE" representing the size of the B2 data, and "STACK #1" to "STACK #N" in which the serial number of A1 data is written. To display the program list screen having the screen layout shown in FIG. 7C, the serial number of the A1 data of the program list corresponding to each time is input in each of the stack #1 to #N for example.

Figure 8:
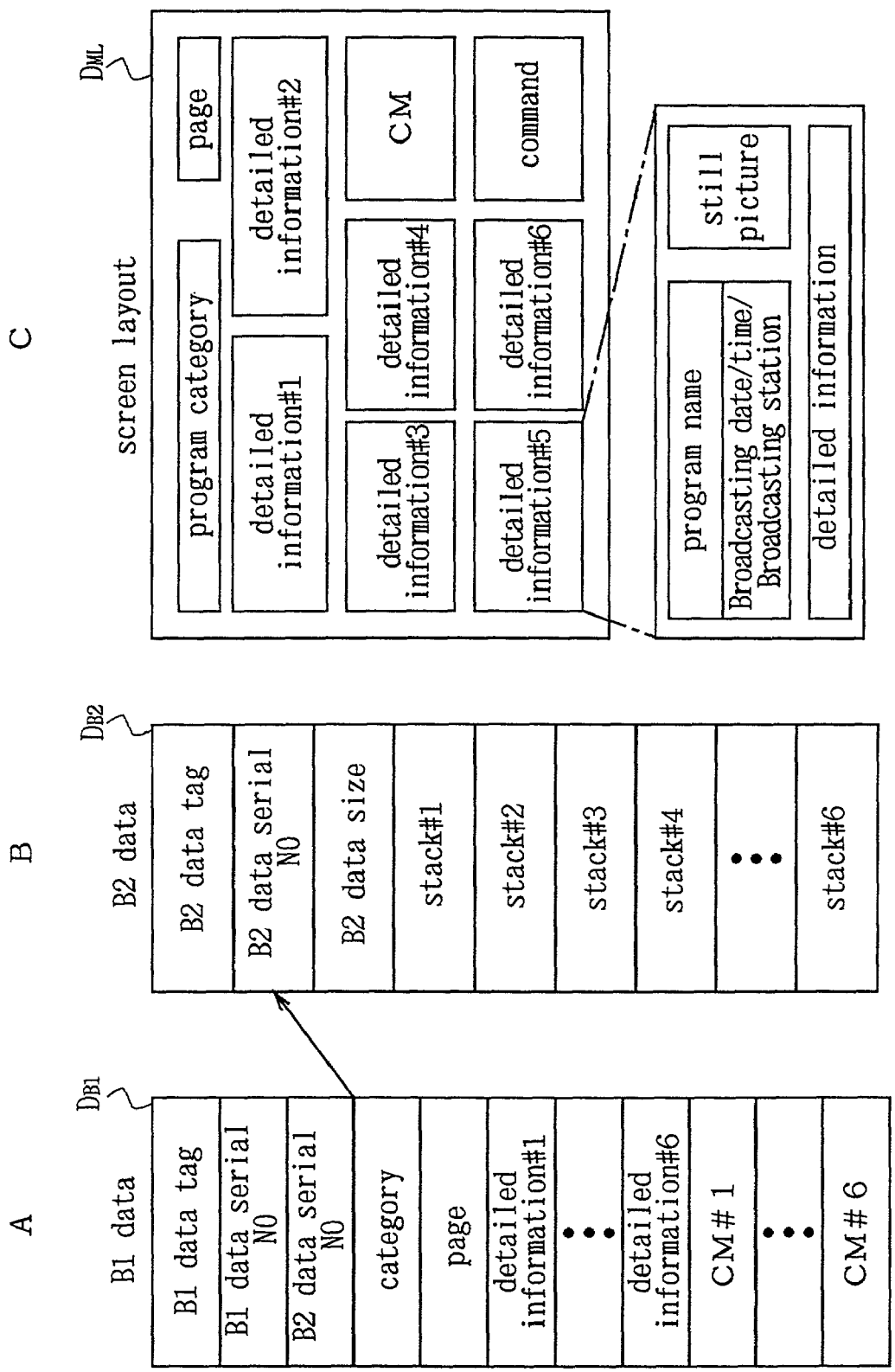
FIG. 8 are schematic diagrams showing B data and the screen layout.

On the other hand, when the layout of the EPG screen is to make a program detailed information screen for displaying the detailed information of programs shown in FIG. 8C based on the screen layout data $D_{ML}$, the EPG processing part 46A (FIG. 6) searches a program for displaying the program detailed information with being classified by category, and inputs the serial number of the A1 data corresponding to a predetermined category in each stack.

As shown in FIG. 8A, the frames of the program detailed information for the number of programs to be displayed are provided in the B1 data $D_{B1}$, and the stack numbers of the B2 data are assigned thereto corresponding to the frames of the program detailed information. The B1 data $D_{B1}$ consists of "B1 DATA TAG" representing B1 data, "B1 DATA SERIAL NO." representing the serial number of the B1 data, "B2 DATA SERIAL NO." representing the serial number of the B2 data corresponding to the B1 data, "CATEGORY", "PAGE", "DETAILED INFORMATION #1" to "DETAILED INFORMATION #6", and "CM#1" to "CM#6". The CM information corresponding to the program detailed information #1 to #6 are assigned to the CM#1 and CM#6 in this case. While, the B2 data $D_{B2}$ consists of the same format (FIG. 7B) as that of the program list screen described above (FIG. 8B).

By using the B1 data $D_{B1}$, the B2 data $D_{B2}$, and the screen layout data $D_{ML}$, the EPG processing part 46A creates the C data (display data) $D_C$. The C data $D_C$ refers the A1 data $DA_{A1}$, the A2 data $D_{A2}$, and the A3 data $D_{A3}$ through the B1 data $D_{B1}$ and the B2 data $D_{B2}$. The C data $D_C$ created in this way is stored in the DRAM 37A as bit map data of the EPG screen, and is read out by the MPEG video decoder 37 described above to be displayed on the EPG screen of the monitor device 23.

In this case, as the screen layout data referred by the C data $D_C$, a standard screen layout data $D_{ML}$, previously stored in a memory of the multimedia processor 46 may be referred in addition to the transmitted screen layout data $D_{ML}$ (FIG. 3).

Figure 9:
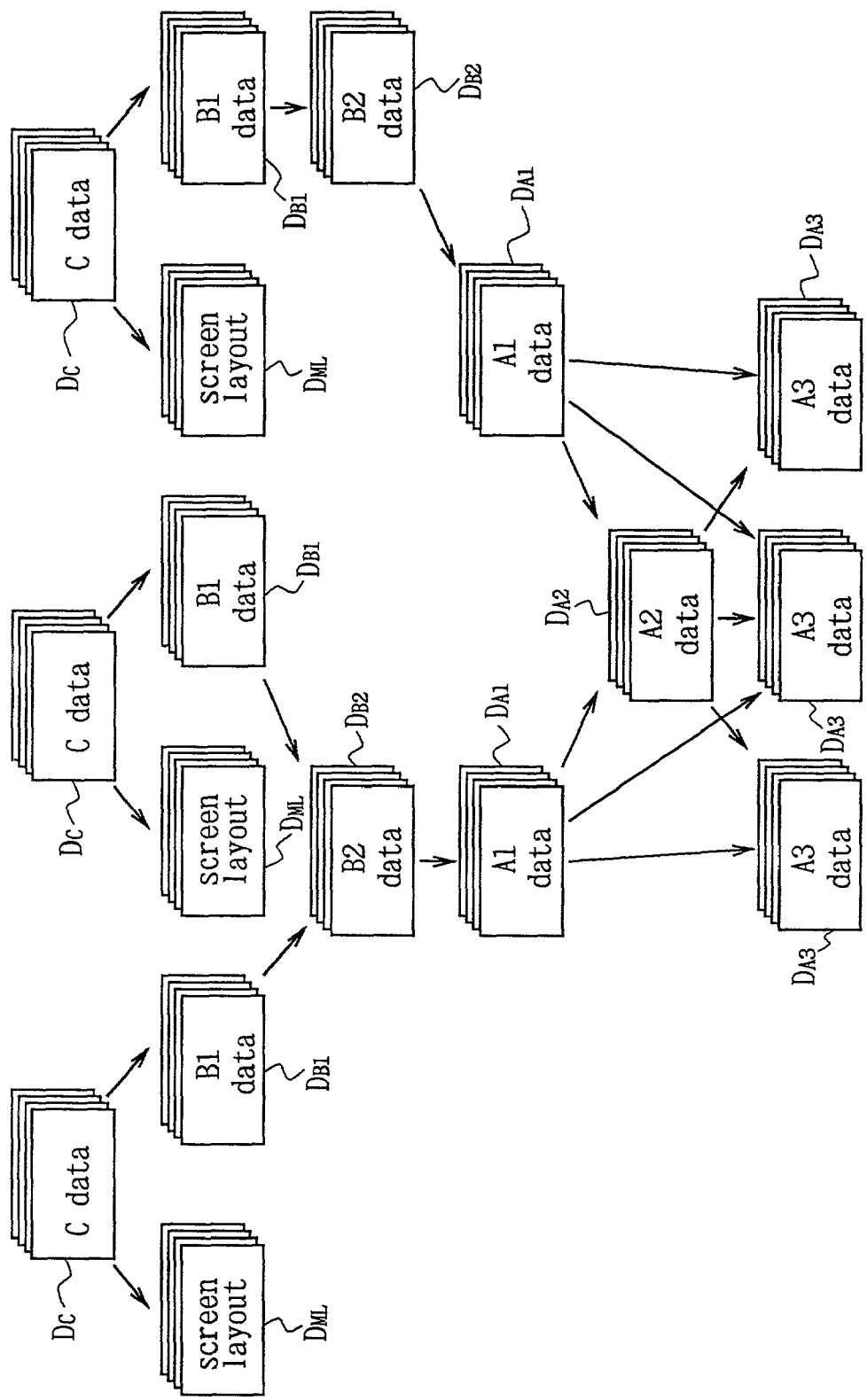
FIG. 9 is a schematic diagram explaining a data reference procedure to create C data.

In this connection, FIG. 9 shows a data referring process to create the C data $D_C$. In this case, an arrow in the figure denotes the direction for referring data. First, the A3 data $D_{A3}$ is referred by the A1 data $D_{A1}$, and the A2 data $DA_2$, the A2 data $D_{A2}$ is referred by the A1 data $D_{A1}$, the A1 data $D_{A1}$ is referred by the B2 data $D_{B2}$, and the B2 data $D_{B2}$ is referred by the B1 data $D_{B1}$. Then, the B1 data $D_{B1}$ and the screen layout data $D_{ML}$ are referred by the C data $D_C$. Therefore, the C data $D_C$ can refer the A3 data $D_{A3}$ through the B3 data $D_{B1}$, the B2 data $D_{B2}$, the A1 data $D_{A1}$, and the A2 data $D_{A2}$.

(7) utilization of electronic program guide information

In FIG. 5, a user operates the remote commander 24 to select the channel of the information providing program representing the electronic program guide information (EPG data $D_{EPG}$) among from a plurality of channels which can be displayed on the display screen 23A of the monitor device 23, so that it can be displayed on the display screen 23A.

Figure 10:
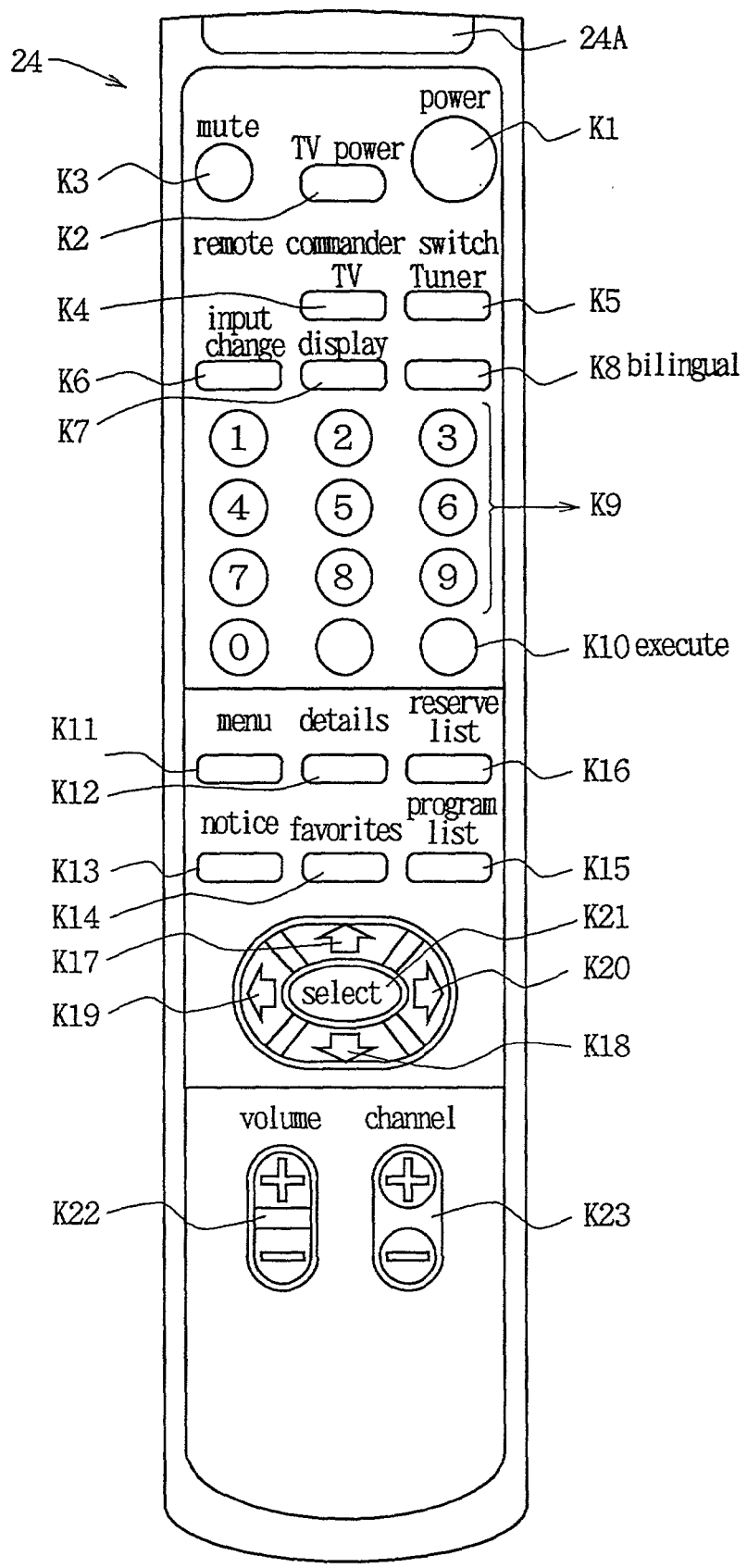
FIG. 10 is a plain diagram showing the outward construction of a remote commander.

FIG. 10 shows the construction of the remote commander 24. An IR signal sending part 24A for sending IR signal corresponding to each key operation described later is provided on the upper portion of the remote commander 24. The remote commander 24 provides with a power supply key K1 and a television power supply key K2 for turning on or off the power source of the integrated receiver/decoder 21 and the monitor device 23 respectively; a mute key K3 for muting sounds or canceling the mute, switch keys K4 and K5 for switching the function of the remote commander 24 between the integrated receiver/decoder 21 and the monitor device 23, an input changing key K6 for changing the input to the integrated receiver/decoder 21, a screen display key K7 for displaying a channel number and so on (which includes a station logo and title) on the screen 23A of the monitor device 23 or erasing the display, a bilingual key K8 for changing a voice output from the monitor device 23 into main voice, sub-voice, or main+sub-voice (foreign language, Japanese, or foreign language and Japanese) in a program of bilingual broadcasting or multiplex broadcasting, ten keys K9, on which numerals "0" to "9" are displayed, for inputting a numeral which is displayed on each key, and an execute key K10 for confirming that numeral is finished to be input and the input numeral represents a channel after the operation of the ten keys K9 is completed.

The remote commander 24 further provides with a menu key K11 for displaying a menu screen to set various items of the integrated receiver/decoder 21 on the monitor device 23, a program details key K12 for displaying a program detailed information of the electronic program guide information, a guide channel previous notice key K13 for displaying the previous notice of programs which will be broadcasted in the future, a favorite list key K14 for displaying the station logo list of channel which has been previously registered by a user, a program list key K15 for displaying the program list based on the electronic program guide, a reserve list key K16 for displaying reserved programs, cursor keys K17 to K20 for transferring a cursor displayed on the screen 23A of the monitor device 23 up and down, left and right (for operating the direction), a select (enter) key K21 for selecting and deciding a frame to which a cursor is transferred by operation of the cursor keys K17 to K20, and a volume up and down key K22 and a channel up and down key K23 for increasing or decreasing volume or channel number.

Figure 11:
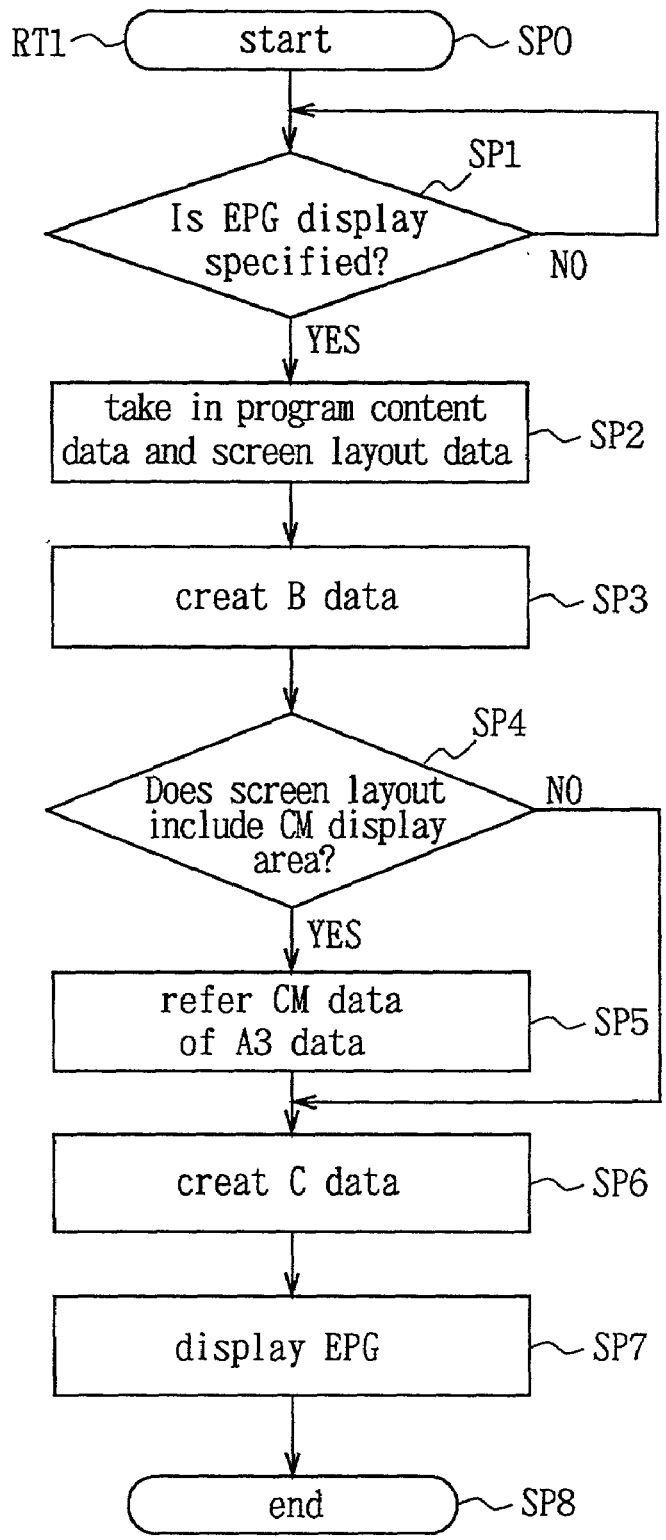
FIG. 11 is a flowchart showing the procedure for displaying EPG.

The system controller 44 can display the electronic program guide on the display screen 23A of the monitor device 23 in accordance with the display processing procedure RT1 of the electronic program guide shown in FIG. 11.

More specifically, when the integrated receiver/decoder 21 is turned on, the system controller 44 starts the display processing procedure RT1 at step SP0, and judges at next step SP1 whether or not the program list key K15 of the remote commander 24 is selected.

If an affirmative result is obtained at step SP1, the system controller 44 proceeds to step SP2 to store the EPG data $D_{EPG}$ (that is, program content data $D_{PC}$ and screen layout data $D_{ML}$) supplied to the integrated receiver/decoder 21 in the memory 46C of the multimedia processor 46, and then proceeds to step SP3.

On the contrary, when a negative result is obtained at step SP1, the system controller 44 returns to step SP1 again to wait until the program list key K15 of the remote commander 24 is selected.

Next, the EPG processing part 46A proceeds to step SP3 under the control of the remote commander 44, to extract necessary items for the layout of display screen based on the screen layout data $D_{ML}$ among from the A1 to A3 data $D_{A1}$ to $D_{A3}$ constituting the program content data $D_{PC}$. The extracted data is used to create the B data $D_B$, and then a processing proceeds to step SP4.

At step SP4, the EPG processing part 46A judges whether or not the layout of the display screen based on the screen layout data $D_{ML}$ includes the CM display area.

When an affirmative result is obtained at step SP4, the EPG processing part 46A proceeds to step SP5 to refer the data F12 (FIG. 4C) relating to CM among from the A3 data $D_{A3}$ constituting the program content data $D_{PC}$, and then proceeds to step SP6.

On the contrary, when a negative result is obtained at step SP4, the system controller 44 proceeds to step SP6 as it is.

Next, the system controller 44 creates the C data $D_C$ based on the B data $D_B$ and the screen layout data Do at step SP6, and creates bit map data of the EPG screen. The created bit map data is stored in the DRAM 37A at step SP7 and displayed by the MPEG video decoder 37. After that, the system controller 44 proceeds to step SP8 to terminate the display processing procedure RT1.

Figure 12:
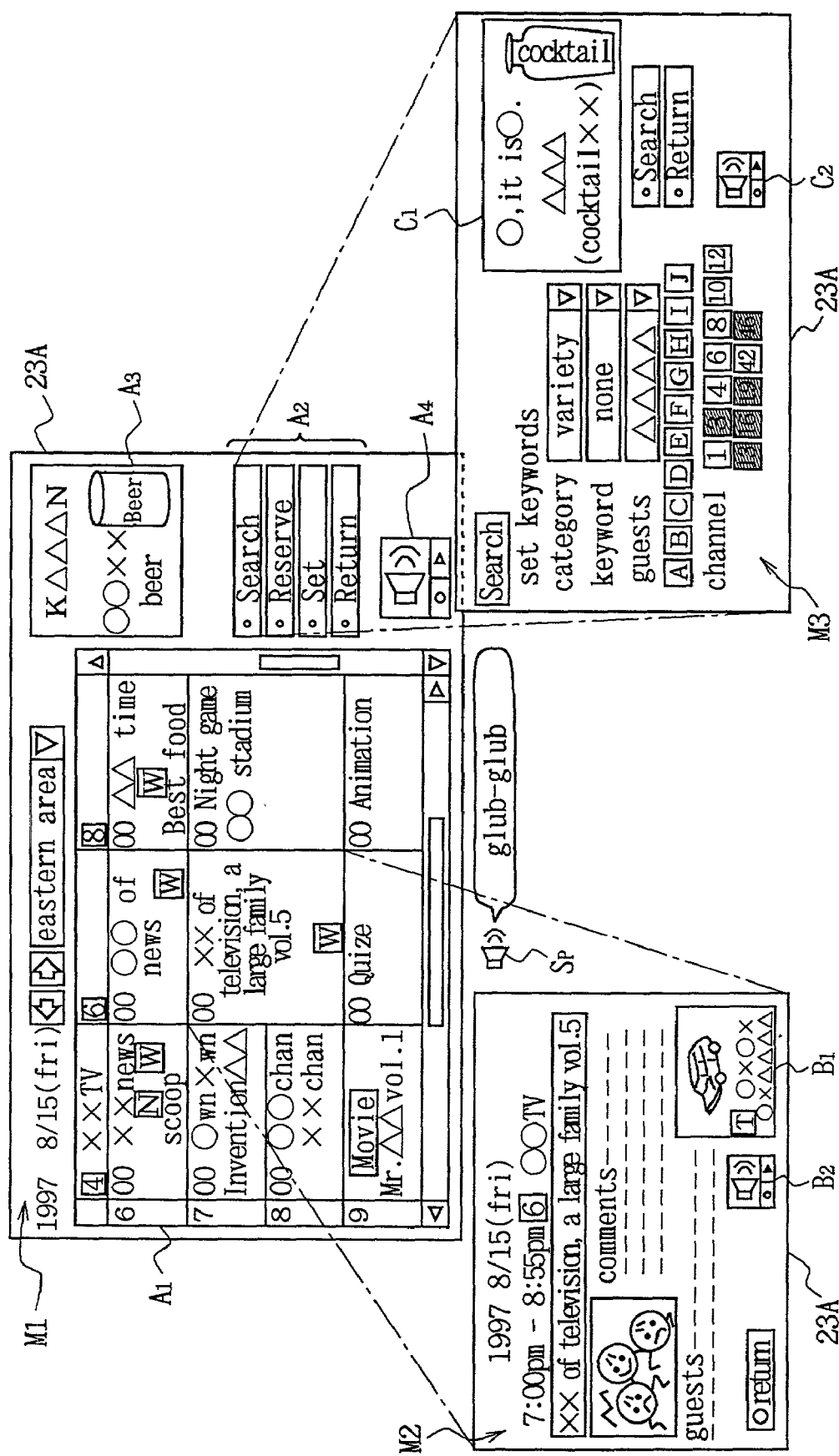
FIG. 12 is a schematic diagram explaining an information providing program displayed on a display screen of a monitor device.

In this way, the EPG screen M1, e.g. the screen shown in FIG. 12, can be displayed on the display screen 23A of the monitor device 23. The EPG screen M1 mainly has a program guide area $A_1$, an operation setting area $A_2$, and a CM display area $A_3$.

In the program guide area $A_1$, the guide columns of television programs in various time zones are displayed for every broadcasting stations, and the program detailed screen of a predetermined form is hierarchically set in each program. In the operation menu area $A_2$, the operation menus of "Search", "Reserve", "Set", and "Return" are displayed, and the operation screen of a predetermined form is hierarchically set in each operation menu.

In the CM display area $A_3$, the image of a program displayed at each guide column constituting the program guide area $A_1$ and CM provided from a CM sponsor who contracts in advertisement are selectively displayed.

When a user actually operates the cursor keys K17 to K20 of the remote commander 24 to transfer a cursor onto the guide column, "X X of television, a large family Vol.5", which is regularly broadcasted at 7:00 pm -8:55 pm in the "○○ TV" broadcasting station of the channel 6 among from the guide columns of the program guide area $A_1$, the CM or the image corresponding to "X X of television, a large family Vol.5" assigned to the guide column is displayed in the CM display area $A_3$.

In the case where a CM is displayed in the CM display area $A_3$, in FIG. 4A to 4C, the data F12 relating to CM of the A3 data $D_{A3}$ is referred by "CM TAG NO." corresponding to "START TIME" (7:00 pm), "END TIME" (8:55 pm), and "BROADCASTING STA. NO." (channel 6) of the A1 data $D_{A1}$. Further, the still picture data F9 of the A3 data $D_{A3}$ is referred by "CM STILL PICTURE NO." of the data F12 relating to CM, and resulting that the still picture data corresponding to "CM STILL PICTURE NO." is displayed in the CM display area $A_3$ of the EPG screen M1.

On the other hand, in the case where a screen is displayed in the CM display area $A_3$, in FIGS. 4A to 4C, the A2 data $D_{A2}$ is referred by the reference A2 data number of the A1 data $D_{A1}$. Further, the still picture data F9 of the A3 data $D_{A3}$ is referred by the still picture number of the A2 data $D_{A2}$, and resulting that the still picture is displayed in the CM display area $A_3$ of the EPG screen M1. In addition, the moving picture is same as this case.

When a user operates the program details key K12 to select and decide the guide column in this condition, the program details screen M2 showing the details of the selected guide column is displayed. At this time, in FIG. 4A to 4C, the program detailed information data F8 of the A3 data $D_{A3}$ is referred by "PROGRAM DETAILED INFORMATION NO." of the A2 data $D_{A2}$, and the still picture data F9 of the A3 data $D_{A3}$ is referred by "STILL PICTURE NO." regarding the program detailed information. Further, the data F7 relating to guest of the A3 data $D_{A3}$ is referred by "GUEST NAME NO.[0]", to "GUEST NAME NO.[N]" of the A2 data $D_{A2}$.

Also in this case, the CM display area $B_1$ is displayed at a predetermined layout position of the program details screen M2, and in the CM display area $B_1$, the CM corresponding to the selected guide column is displayed. In FIG. 4A to 4C, the data F12 relating to CM of the A3 data $D_{A3}$ is referred by the same "CM TAG NO." as the CM display area $A_3$ on the EPG screen M1, and at the same time, the still picture data F9 of the A3 data $D_{A3}$ is referred by "CM STILL PICTURE NO." of the data F12 relating to CM.

When a user operates the cursor keys K17 to K20 of the remote commander 24 to transfer a cursor onto the operation menu, "Search", among from the operation menus in the operation menu area $A_2$, and then operates the select key K21 to select and decide the operation menu, the operation screen M3 showing the method of operating the selected operation menu is displayed.

Further, the CM display area $C_1$ is displayed at a predetermined layout position on the operation screen M3, and in the CM display area $C_1$, the CM in accordance with the guide column searched by the search operation is displayed.

In this way, different CMs are displayed in the CM display areas $A_3$ of the EPG screen M1, the CM display areas $B_1$ of the program details screen M2, and the CM display areas $C_1$ of the operation screen M3 respectively.

When a user operates the remote commander 24 to match a cursor with the CM display area $A_3$, $B_1$, or $C_1$ to click it, a home page showing the detailed information of the CM displayed on the CM display area $A_3$, $B_1$, or $C_1$ is obtained from the www server on the Internet 5, so as to display it on the display screen 23A of the monitor device 23.

Figure 13:
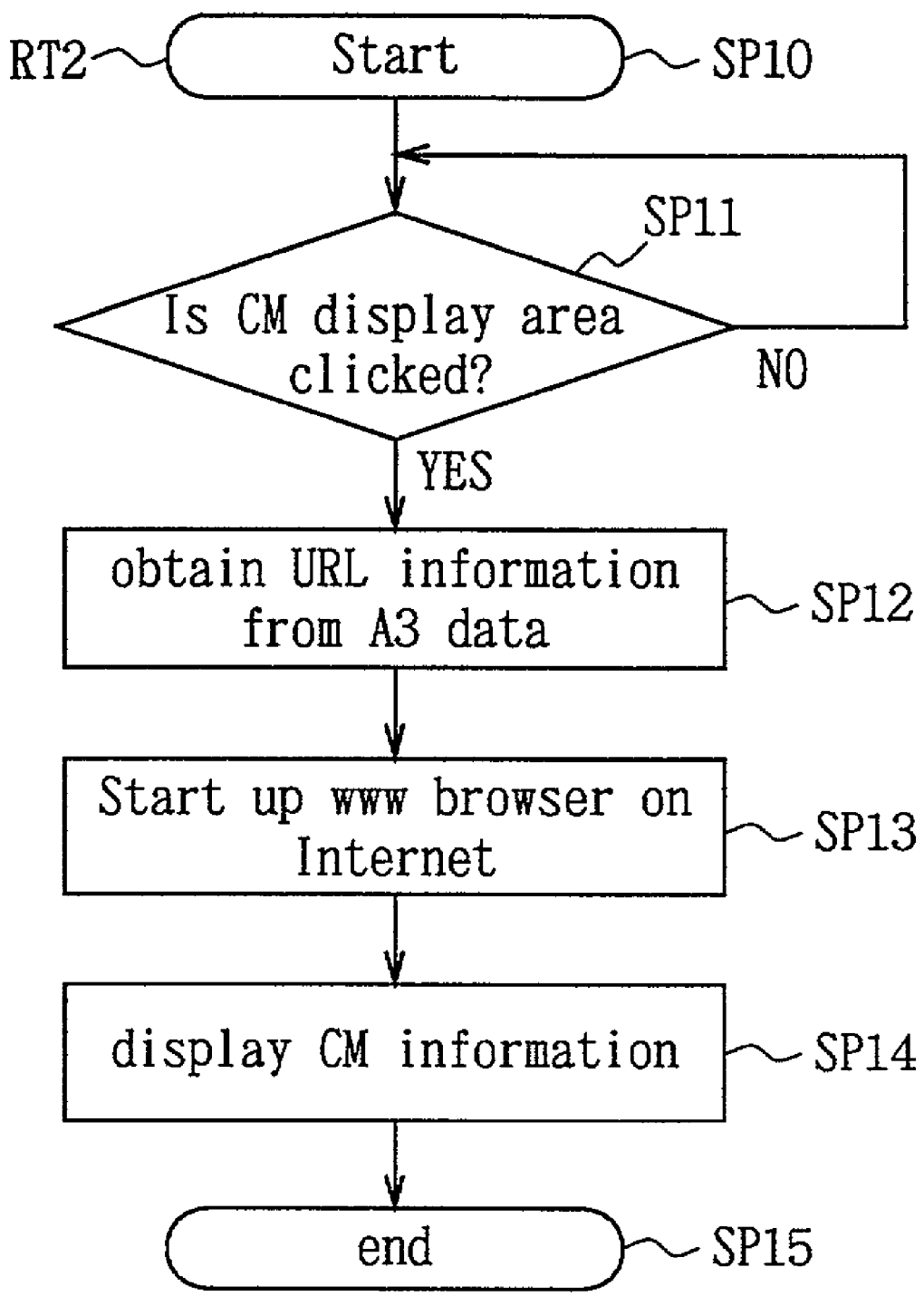
FIG. 13 is a flowchart showing the procedure for displaying CM information.

In this case, the system controller 44 displays the home page showing the detailed information of the CM displayed in the CM display area $A_3$, $B_1$, or $C_1$ on the display screen 23A of the monitor device 23 in accordance with the display processing procedure RT2 of the CM information shown in FIG. 13.

More specifically, the cursor keys K17 to K20 of the remote commander 24 are operated, in the condition that the EPG screen M1, the program details screen M2, or the operation screen M3 is displayed on the display screen 23A of the monitor device 23, to transfer a cursor to the CM display area $A_3$, $B_1$, or $C_1$, the system controller 44 starts the display processing procedure RT2 at step SP10, and judges whether or not the select key K21 of the remote commander 24 is clicked at step SP11.

If an affirmative result is obtained at step SP11, the system controller 44 proceeds to step SP12 to read out the URL information corresponding to the CM displayed on the CM display area $A_3$, $B_1$, or $C_1$ from the data F12 of the A3 data $D_{A3}$ (FIG. 4C) among from the program content data $D_{PC}$ which are stored in the memory 46C of the multimedia processor 46.

On the contrary, if a negative result is obtained at step SP11, the system controller 44 returns to step SP11 again to wait until the select key K21 of the remote commander 24 is clicked.

Then, the system controller 44 proceeds to step SP13 to start up the browser controlling part 46B in the multimedia processor 46. The started up browser controller part 46B accesses a page corresponding to the specified URL information through a modem 52. Thereby, the HTML data of the home page obtained from a desired CM sponsor's terminal device 6 is displayed by the browser controlling part 46B, and stored in the DRAM 37A with a bit map form (step SP14).

Figure 14:
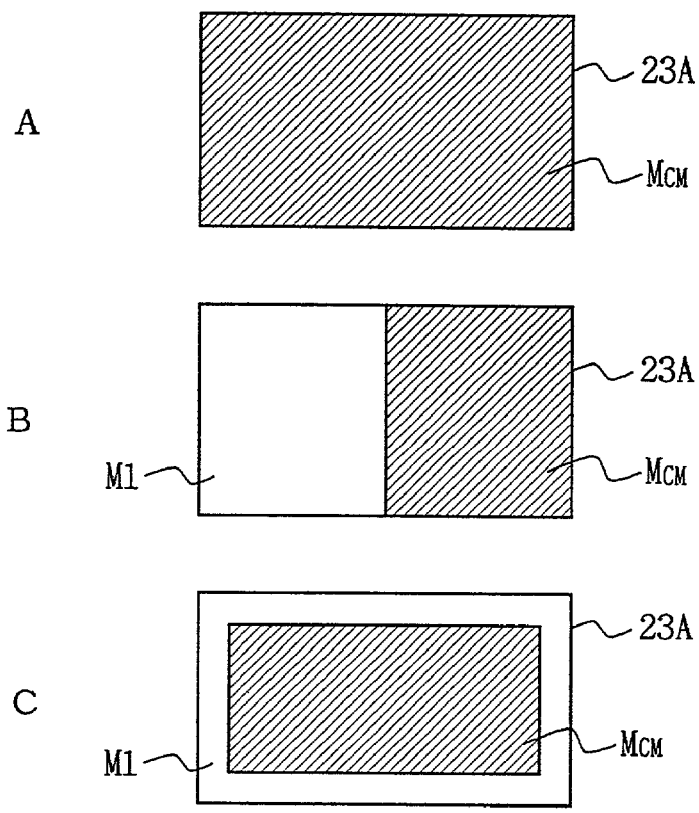
FIG. 14 are schematic diagrams showing display examples of home page.

Thus, the bit map data stored in the DRAM 37A is read out by the MPEG video decoder 37 and displayed on the display screen 23A. As a display method, as shown in FIG. 14A to 14C, there are three kinds of display methods, whole screen display, two-divided display, and overlay display (the EPG screen M1 can be viewed transparently), which is selected by a user. After that, a processing proceeds to step SP15 to terminate the display processing procedure RT2.

(8) Operation and effects of the embodiment

In the above construction, in the condition that the EPG screen M1 is displayed on the display screen 23A of the monitor device 23, a user matches a cursor with a desired program among from a plurality of programs displayed on the EPG screen M1 and clicks the select key K21 of the remote commander 24, so that the detailed information of the program with which the cursor is matched is displayed on the display screen 23A as a program detailed information M2.

In such successive operation, the CM of a sponsor providing a program in which a user is interested (i.e., a program with which the cursor is matched) is displayed in the CM display area $A_3$ of the EPG screen M1, and further the CM of a sponsor providing the program is displayed also in the CM display area $B_1$ of the program details screen M2 which is displayed on the display screen 23A. Thus, the CM of a sponsor providing the program to which a user pays attention is displayed on the EPG screen M1 and the program details screen M2 by selecting the program by the user.

When the user operates the remote commander 24 to match a cursor onto the CM display area $A_3$, $B_1$, or $C_1$ and clicks the select key K21, the home page showing the detailed information of the CM can be displayed.

A user can get a desired information among from the information transmitted via a digital broadcasting through an Internet at any time. As a result, it can be prevented that the construction of the receiving apparatus is magnified and complicated because the information transmitted via the digital broadcasting must be all stored, and the information transmitted via the digital broadcasting is unnecessary to be increased.

According to the above construction, at the time of searching a program using the EPG screen, a user can view the CM of the sponsor providing an interesting program, and simultaneously, the detailed information of a desired CM selected by user can be easily obtained through the Internet if necessary.

(9) Other embodiments

The embodiment described above has dealt with the case where this invention is applied to a system for transmitting a television broadcasting by a broadcasting wave from the transmitting apparatus 2 in the broadcasting station via the satellite transponder 3. However, this invention is not only limited to this, but it can be transmitted via a ground wave circuit or a ground wire circuit from the transmitting apparatus 2 in the broadcasting station.

Figure 15:
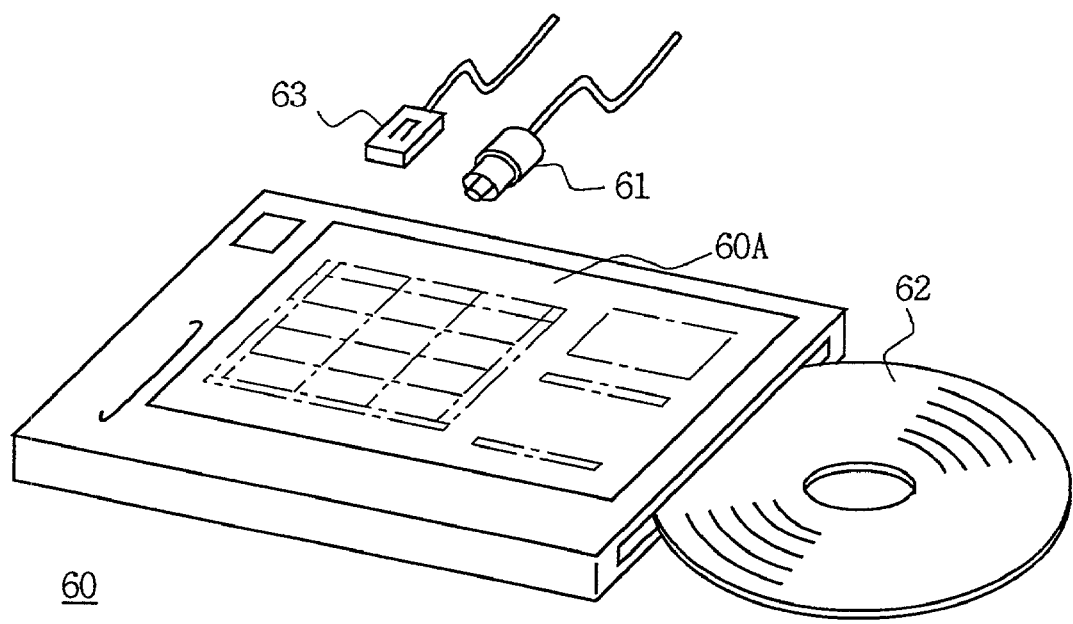
FIG. 15 is a schematically perspective view showing the outward construction of a program guide display device according to other embodiment.

Also, the program guide display device 60 shown in FIG. 15 is connected to a television receiving apparatus (not shown) through the television line 61, and the information recording medium 62 such as a DVD-ROM and a CD-ROM in which the EPG data $D_{EPG}$ is recorded is loaded in the program guide display device 60 to read this, so that the same screen as the above-mentioned information providing program (EPG screen M1, the program details screen M2 or the operation screen M3) can be displayed on the touch panel 60A. In this case, a telephone circuit 63 is connected to the program guide display device 60 via the www server and Internet 5 similar to the above described case.

Further, the embodiment described above has dealt with the case where various CMs are only displayed in the CM display area $A_3$, $B_1$, or $C_1$ which is displayed on the EPG screen M1, the program details screen M2, or the operation screen M3. However, this invention is not only limited to this, but the corresponding URL information also can be displayed by characters in the CM display area $A_3$, $B_1$, or $C_1$ in addition to the CM.

Further, the embodiment described above has dealt with the case where various CMs are only displayed in the CM display area $A_3$, $B_1$, or $C_1$ which is displayed on the EPG screen M1, the program details screen M2, or the operation screen M3. However, this invention is not only limited to this, but as shown in FIG. 12, a cursor is matched with the CM display area $A_3$, $B_1$, or $C_1$ so as to play a sound corresponding to the CM from a sound output means (speaker $S_P$) provided in the monitor device 23.

Practically, when a user operates the remote commander 24 to match a cursor with the sound output area $A_4$ displayed on the EPG screen M1 and clicks it, the sound corresponding to the CM "K△△△N ○○X X beer" which is displayed in the CM display area $A_3$ is played from the speaker $S_P$.

In this case, in FIGS. 4A to 4C, the data F12 relating to the CM of the A3 data $D_{A3}$ is referred by "CM TAG NO." corresponding to "START TIME" (7:00 pm), "END TIME" (8:55 pm), and "BROADCASTING STA. NO." (channel 6) of the A1 data $D_{A1}$. Further, the sound data F10 of the A3 data $D_{A3}$ is referred by "CM SOUND NO." of the data F12 relating to the CM, and resulting that the sound corresponding to "CM SOUND NO." is played from the speaker $S_P$.

Further, the embodiment described above has dealt with the case where in FIGS. 4A to 4C, "CM STILL PICTURE NO." of the data F12 relating to the CM refers the still picture data F9 of the A3 data $D_{A3}$, so that the still picture data corresponding to "CM STILL PICTURE NO." is displayed in the CM display area $A_3$ on the EPG screen M1. However, this invention is not only limited to this, but "CM MOVING PICTURE NO." of the data F12 relating to the CM refers the moving picture data F11 of the A3 data $D_{A3}$, so that the moving picture data corresponding to "CM MOVING PICTURE NO." can be displayed in the CM display area $A_3$ on the EPG screen M1. Similarly, not only still picture but also moving picture can be displayed in the CM display area $B_1$ on the program details screen M2 and the CM display area $C_1$ on the operation screen M3.

Further, the embodiment described above has dealt with the case where the CM provided by a CM sponsor who contracts in advertisement with a program displayed at each guide column constituting the program guide area $A_1$ is selectively displayed in the CM display area $A_3$ on the EPG screen M1. However, this invention is not only limited to this, but a plurality of CMs can be successively displayed for a single program. Similarly, a plurality of CMs for a single program can be successively displayed in the CM display area $B_1$ of the program details screen M2 and the CM display area $C_1$ of the operation screen M3.

In this case, in FIG. 4A to 4C, if a plurality of "CM TAG NO." are put in the A1 data $D_{A1}$ and these "CM TAG NO." successively refers the data F12 relating to the CM of the A3 data $D_{A3}$, a plurality of CMs for a single program can be successively displayed with being shifted temporally.

Further, the embodiment described above has dealt with the case where the commercial information (CM) of the sponsor providing a corresponding program is applied as the distribution information displayed with the information of each program. However, this invention is not only limited to this, but other distribution information can be widely applied if it is an information providing the more detailed information and latest information of corresponding program, such as the latest information of "automobiles for race" in the "car race" program.

Further, the embodiment described above has dealt with the case where the remote commander 24 is used as specifying means for specifying the distribution information (CM information) displayed with each program information (EPG data) which is displayed on the display screen 23A of the monitor device 23. However, this invention is not only limited to this, but a desired distribution information can be specified by selecting and pressing the panel plane of the touch panel by a user. Also, a desired distribution information can be specified by transferring a cursor on the display screen 23A and clicks it by a user.

Further, the embodiment described above has dealt with the case where the EPG data $D_{EPG}$ is transmitted by using the MPEG2 system. However, this invention is not only limited to this, but the EPG data $D_{EPG}$ can be transmitted by using other image compression techniques such as the MPEG1 and JPEG.

Further, the embodiment described above has dealt with the case where the www server is used as a computer server for providing the CM detailed information. However, this invention is not only limited to this, but other various servers such as a mail server having a function of sending and receiving a mail, a news server having a function of exchanging information by a meeting or a notice board, and a FTP server having a function of sending a file. Moreover, the embodiment described above has dealt with the case where the integrated receiver/decoder 21 and the computer server are connected each other through a telephone line. However, this invention is not only limited to this, but data can be sent and received via a satellite transponder for example other than the telephone line.

Furthermore, the embodiment described above has dealt with the case where the Internet 5 is used as a computer network. However, this invention is not only limited to this, but is widely applicable to other various communication networks such as a computer network service.

According to this invention described above, the address information for reading the detailed information of the computer server which provides the detailed information of the distribution information displayed on a predetermined display screen together with a single program or plural programs is transmitted with each program information, so as to realize an information transmitting method and a television broadcasting receiving apparatus which easily obtain, if necessary, the detailed information of the distribution information transmitted with each program information without storage of it at a receiving side.

INDUSTRIAL APPLICABILITY

In the information transmitting method and the television broadcasting receiving apparatus, this invention can be utilized in the case where the information is distributed by using a satellite broadcasting system, a ground wave broadcasting system, or a wire broadcasting system.

DESCRIPTION OF REFERENCE NUMERALS

1...program broadcasting system, 2...transmitter, 3...satellite transponder, 4...receiver, 5...Internet, 6, 7...terminal device, 10...output management data producing part, 12...EPG editor, 11...main control part, 12...multiplexer, 20...parabolic antenna, 21... integrated receiver/decoder, 22...VCR, 23...monitor device, 23A...display screen, 24...remote commander, 30...front end, 36...demultiplexer, 44...system controller, 46...multimedia processor, 46A...data converting part, 46B...browser controlling part, 46C...memory, 46D...graphic engine, 52...modem, 60...program guide display device.

The invention claimed is:

1. An information-transmitting method for transmitting program guide information, said method comprising the steps of:

processing a plurality of commercial information which corresponds to said program guide information and which is automatically displayed for a single program column or a plurality of program columns on a program guide screen in a receiver and is transmitted together with said program guide information;

wherein, when a cursor is moved onto a program of a program column of the program guide screen, each of said commercial information provided by a commercial information sponsor of the program displayed at each program column is displayed successively in a single area of the display, shifted temporally from one another; and selectively picking program content data from a plurality of program content regions and combining the selectively picked program content data from said plurality of program content regions with transmitted screen layout data and previously stored standard screen layout data to create said program guide screen;

wherein the program guide screen further includes a sound output area for controlling the sound output of the commercial information, and wherein said program content data includes at least three types of data that include modifiable data, fixed data and comparatively large-sized data; and wherein the modifiable data includes a broadcast schedule of a program and a first reference number to the fixed data the fixed data includes a name of the program, a second reference number to the modifiable data, and a third reference number to the comparatively large-sized data, and the comparatively large-sized data includes sound data and video data of a commercial, and wherein said selectively picked program content data are categorized in at least two types of data with different structures and formats, and wherein a plurality of commercials are successively displayed on a same program guide screen that displays program details for a single program, and wherein the commercial information includes a remote network server address information.

2. The information transmitting method according to claim 1, wherein said commercial information includes at least image data.

3. The information transmitting method according to claim 2, wherein said commercial information further includes sound data.

4. The information transmitting method according to claim 1, wherein said commercial information further includes address information of a computer which provides the detailed information of said commercial.

5. The information transmitting method according to claim 1, wherein said program guide information is composed of a plurality of hierarchical levels in accordance with the data size, the first hierarchical level having a small amount of data includes identification information for identifying said commercial information and the second hierarchical level having a large amount of data including identification information for identifying said commercial information and the actual commercial information.

6. The information transmitting method according to claim 1, wherein when a cursor is moved onto one program column on said electronic program guide screen, display processing is performed to automatically display for a single program column or a plurality of program columns in sequence a plurality of commercial information included in one program onto which the cursor has been moved in said part of the display area on said electronic program guide screen.

7. A receiving apparatus for receiving a signal including commercial information and electronic program guide information, said receiving apparatus comprising:

processor for displaying a plurality of commercial information in a part of a display area and an electronic program guide screen including program columns corresponding to a plurality of programs based on the received electronic program guide information;

wherein, when a cursor is moved onto a program of a program column of said program guide screen, said processor performs display processing to automatically and successively in a single area of the display, being shifted temporally from one another, for a single program column or a plurality of program columns a plurality of commercial information provided by a commercial information sponsor of the program displayed at each program column in said part of the display area on said electronic program guide screen; and program guide processing section for selectively picking program content data from a plurality of program content regions and combining the selectively picked program content data from said plurality of program content regions with transmitted screen layout data and previously stored standard screen layout data to create said program guide screen;

wherein the display area further includes a sound output area for controlling the sound output of the commercial information, and wherein said program content data includes at least three types of data that include modifiable data, fixed data and comparatively large-sized data; and wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and wherein said selectively picked program content data are categorized in at least two types of data with different structures and formats, wherein a plurality of commercials are successively displayed on a same program guide screen that displays program details for a single program, and wherein the processor displays a remote network server address of the commercial information sponsor and enables a user to select the remote network server address and, in response to said selection, display detailed information of the commercial information.

8. The receiving apparatus according to claim 7, comprising:

specifying section for specifying a commercial information displayed on a part of said program guide screen; and communication section for communicating with an external computer through a computer network, wherein said processor picks up the detailed information of said commercial information from the external computer through said communication section to display the picked up detailed information, based on the address information included in said commercial information, when said commercial information is specified by said specifying section.

9. The receiving apparatus according to claim 7, wherein said processor, when one program column is selected on said electronic program guide screen, performs display processing to display a program details screen showing in detail the program corresponding to the program column selected and to sequentially display plural items of commercial information included in the program in a part of the display area on said program details screen.

10. The receiving apparatus according to claim 9, wherein said processor, when commercial information being displayed in said part of the display area on said program details screen is designated, performs display processing to display a commercial details screen showing in detail said designated commercial information.

11. The receiving apparatus according to claim 7, wherein said processor, when commercial information being displayed in said part of the display area on said electronic program guide screen is designated, performs display processing to display a commercial details screen showing in detail said commercial information designated.

12. The receiving apparatus according to claim 7, wherein said commercial information is commercial information of sponsors for providing said programs.

13. The receiving apparatus according to claim 7, wherein said commercial information includes at least image data.

14. The receiving apparatus according to claim 13, wherein said commercial information further includes audio data.

15. The receiving apparatus according to claim 7, wherein when a cursor is moved onto one program column on said electronic program guide screen, said processor performs display processing to sequentially display a plurality of commercial information included in one program onto which the cursor has been moved in said part of the display area on said electronic program guide screen.

16. A receiving method, comprising the steps of:
receiving a signal including a plurality of commercial information and electronic program guide information;
displaying commercial information in a part of a display area and an electronic program guide screen having program columns corresponding to a plurality of programs on the basis of the received electronic program guide information;
moving a cursor onto one program column on said electronic program guide screen being displayed;
automatically and successively displaying in a single area of the display, shifted temporally from one another, for a program of a single program column or a plurality of program columns a plurality of said commercial information provided by a commercial information sponsor of the program displayed at each program column included in the one program onto which the cursor has been moved, in said part of the display area on said electronic program guide screen;
displaying a remote network server address of a commercial information sponsor of the program;
enabling a user to select the remote network server address;
displaying, in response to said selection, detailed information of the commercial information; and
selectively picking program content data from a plurality of program content regions and combining the selectively picked program content data from said plurality of program content regions with transmitted screen layout data and previously stored standard screen layout data to create said program guide screen;
wherein the display area further includes a sound output area for controlling the sound output of the commercial information,
wherein said program content data includes at least three types of data that include modifiable data, fixed data and comparatively large-sized data; and
wherein the modifiable data includes a broadcast schedule of a program and a first reference number to the fixed data, the fixed data includes a name of the program, a second reference number to the modifiable data, and a third reference number to the comparatively large-sized data, and the con partitively large-sized data includes sound data and video data of a commercial, and
wherein a plurality of commercials are successively displayed on a same program guide screen that displays program details for a single program, and
wherein said selectively picked program content data are categorized in at least two types of data with different structures and formats.

17. The receiving method according to claim 16, wherein when one program column is selected on said electronic program guide screen, a program details screen showing in detail the program corresponding to the program column selected, and plural items of commercial information included in the program are sequentially displayed in a part of the display area on said program details screen.

18. The receiving method according to claim 17, wherein when commercial information being displayed in said part of the display area on said program details screen is designated, a commercial details screen showing in detail the designated commercial information is displayed.

19. The receiving method according to claim 16, wherein when commercial information being displayed in said part of the display area on said electronic program guide screen is designated, a commercial details screen showing in detail the designated commercial information is displayed.

20. The receiving method according to claim 16, wherein said commercial information is commercial information of sponsors for providing said programs.

21. The receiving method according to claim 16, wherein said commercial information includes address information of a computer on a computer network for providing detailed information of said commercials.

22. The receiving method according to claim 16, wherein when a cursor is moved onto one program column on said electronic program guide screen, display processing is performed to sequentially display a plurality of commercial information included in one program onto which the cursor has been moved in said part of the display area on said electronic program guide screen.

23. A transmitting-receiving system, comprising:
a transmitting apparatus for transmitting a signal including a plurality of commercial information and electronic program guide information; and
a receiving apparatus for receiving said signal, said receiving apparatus:
displaying commercial information in a part of a display area and an electronic program guide screen having program columns corresponding to a plurality of programs on the basis of the electronic program guide information;
moving a cursor onto one program column on said electronic program guide screen being displayed;
automatically and successively displaying in a single area of the display, shifted temporally from one another, for a program of a single program column or a plurality of program columns a plurality of said commercial information provided by a commercial information sponsor of the program displayed at each program column included in the one program onto which the cursor has been moved, in said part of the display area on said electronic program guide screen;
displaying a remote network server address of a commercial information sponsor of the program;
enabling a user to select the remote network server address;
displaying, in response to said selection, detailed information of the commercial information; and
selectively picking program content data from a plurality of program content regions and combining the selectively picked program content data from said plurality of program content regions with transmitted screen layout data and previously stored standard screen layout data to create said program guide screen;
wherein the display area further includes a sound output area for controlling the sound output of the commercial information,
wherein said program content data includes at least three types of data that include modifiable data, fixed data and comparatively large-sized data; and wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and wherein a plurality of commercials are successively displayed on a same program guide screen that displays program details for a single program, and wherein said selectively picked program content data are categorized in at least two types of data with different structures and formats.

24. The system according to claim 23, wherein said commercial information is commercial information of sponsors for providing said programs.

25. The system according to claim 23, wherein said commercial information includes address information of a computer on a computer network which provides detailed information of said commercials.

26. The system according to claim 23, wherein said commercial information includes at least image data.

27. The system according to claim 26, wherein said commercial information further includes audio data.

28. The system according to claim 23, wherein when a cursor is moved onto one program column on said electronic program guide screen, display processing is performed to sequentially display a plurality of commercial information included in one program onto which the cursor has been moved in said part of the display area on said electronic program guide screen.

29. An information-transmitting method for transmitting program guide information, the method comprising the steps of:
  processing a plurality of commercial information that corresponds to the program guide information and that is automatically displayed for a single program column or a plurality of program columns on a program guide screen in a receiver and is transmitted together with the program guide information;
  wherein, when a cursor is moved onto a program of a program column of the program guide screen, each of the commercial information sponsor of the program displayed at each program column is displayed successively in a single area of the display, shifted temporally from one another; and
  wherein program content data of the program guide information includes at least three types of data that include modifiable data, fixed data and comparatively large-sized data; and
  wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and
  wherein the program guide screen further includes a sound output area for controlling the sound output of the commercial information; and
  wherein a plurality of commercials are successively displayed on a same program guide screen that displays program details for a single program, and
  wherein the commercial information includes a remote network server address information.

30. A receiving apparatus for receiving a signal including a plurality of commercial information and electronic program guide information, the receiving apparatus comprising:
  processor for displaying the plurality of commercial information in a part of a display area and an electronic program guide screen including program columns corresponding to a plurality of programs based on the received electronic program guide information;
  wherein, when a cursor is moved onto a program of a program column of the program guide screen, the processor performs display processing to automatically and successively display in a single area of the display, shifted temporally from one another, for a single program column or a plurality of program columns the plurality of commercial information provided by a commercial information sponsor of the program displayed at each program column in the part of the display area on the electronic program guide screen,
  wherein program content data of the program guide information includes at least three types of data that include modifiable data, fixed data and comparatively large-sized data; and
  wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and
  wherein the display area screen further includes a sound output area for controlling the sound output of the commercial information, and
  wherein a plurality of commercials are successively displayed on a same program guide screen that displays program details for a single program, and
  wherein the processor displays a remote network server address of the commercial information sponsor of the program and enables a user to select the remote network server address and, in response to said selection, display detailed information of the commercial information.

31. A receiving method, comprising the steps of:
  receiving a signal including a plurality of commercial information and electronic program guide information;
  displaying the plurality of commercial information in a part of a display area and an electronic program guide screen having program columns corresponding to a plurality of programs on the basis of the received electronic program guide information:
  moving a cursor onto one program column on the electronic program guide screen being displayed;
  automatically and successively displaying in a single area of the display, shifted temporally from one another, for a program of a single program column or a plurality of program columns a plurality of commercial information provided by a commercial information sponsor of the program displayed at each program column included in the one program onto which the cursor has been moved, in the part of the display area on the electronic program guide screen;
  displaying a remote network server address of a commercial information sponsor of the program;
  enabling a user to select the remote network server address; and
  displaying, in response to said selection, detailed information of the commercial information, wherein program content data of the program guide information includes at least three types of data that include modifiable data, fixed data and comparatively large-sized data; and wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and wherein a plurality of commercials are successively displayed on a same program guide screen that displays program details for a single program, and wherein the display area further includes a sound output area for controlling the sound output of the commercial information.

32. A transmitting-receiving system, comprising:

a transmitting apparatus for transmitting a signal including a plurality of commercial information and electronic program guide information; and a receiving apparatus for receiving the signal, the receiving apparatus:

a display apparatus to display commercial information in a part of a display area and an electronic program guide screen having program columns corresponding to a plurality of programs on the basis of the received electronic program guide information; and wherein the display area further includes a sound output area for controlling the sound output of the commercial information, and wherein the transmitting-receiving apparatus automatically and successively displays in a single area of the display, shifted temporally from one another, for a program of a single program column or a plurality of program columns a plurality of commercial information provided by a commercial information sponsor of the program displayed at each program column included in the one program onto which a cursor has been moved, in the part of the display area on the electronic program guide screen, and wherein program content data of the program guide information includes at least three types of data that include modifiable data, fixed data and comparatively large-sized data; and wherein the modifiable data includes a broadcast schedule of a program and a first reference number to the fixed data, the fixed data includes a name of the program, a second reference number to the modifiable data, and a third reference number to the comparatively large-sized data, and the comparatively large-sized data includes sound data and video data of a commercial, and wherein a plurality of commercials are successively displayed on a same program guide screen that displays program details for a single program, and wherein the receiving apparatus causes the display apparatus to display a remote network server address of the commercial information sponsor of the program and enables a user to select the remote network server address and, in response to said selection, display detailed information of the commercial information.

33. The transmitting-receiving system of claim 32, wherein the transmitting apparatus further comprises:

an output management data producer to provide management information for a plurality of programs in the EPG including program broadcast time;

an EPG editor to receive the management information and commercial information and to provide EPG data;

a multiplexer to combine encoded audio/visual program data synchronized with the EPG data and produce an EPG transmission signal for transmission.

wherein the EPG data has program content data on the programs of each broadcasting channel during a predetermined time interval that hierarchically includes (1) broadcasting form data for regular program, for rebroadcasting programs, for broadcasting programs at a key station, or for broadcasting at a local station; (2) group data that is common in a plurality of programs of the broadcasting form data arranged as a single program; and (3) detailed contents data including respective programs of the broadcast form data and the particular information group data.

34. A method of displaying commercial data on an electronic program guide, comprising:

receiving the electronic program guide information and a plurality of commercial information;

displaying on a display the electronic program guide information having program columns corresponding to a plurality of programs;

in response to moving a cursor onto a program of a program column, shifted temporally from one another, automatically and successively displaying in a single area of the display, a plurality of commercial information in a part of the display of the electronic program guide; and displaying a remote network server address of a commercial information sponsor of the program;

enabling a user to select the remote network server address;

displaying, in response to said selection, detailed information of the commercial information, wherein program content data of the program guide information includes at least three types of data that include modifiable data, fixed data and comparatively large-sized data; and wherein the modifiable data includes a broadcast schedule of a program and a first reference number to the fixed data, the fixed data includes a name of the program, a second reference number to the modifiable data, and a third reference number to the comparatively large sized data, and the comparatively large-sized data includes sound data and video data of a commercial, and wherein the display further includes a sound output area for controlling the sound output of the commercial information, and wherein a plurality of commercials are successively displayed on a same program guide screen that displays program details for a single program, and wherein each of the plurality of commercial information is provided by a commercial information sponsor of the program displayed at each program column.

* * * * *